(12) United States Patent
Chou et al.

(10) Patent No.: US 8,351,308 B2
(45) Date of Patent: Jan. 8, 2013

(54) THERMALLY ASSISTED MAGNETIC RECORDING HEAD HAVING V-SHAPED PLASMON GENERATOR

(75) Inventors: Tsutomu Chou, Tokyo (JP); Eiji Komura, Tokyo (JP); Shinji Hara, Tokyo (JP); Kosuke Tanaka, Tokyo (JP); Daisuke Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 179 days.

(21) Appl. No.: 12/892,540

(22) Filed: Sep. 28, 2010

(65) Prior Publication Data

US 2012/0075967 A1    Mar. 29, 2012

(51) Int. Cl.
G11B 11/00 (2006.01)
(52) U.S. Cl. .................................. 369/13.33; 369/13.13
(58) Field of Classification Search ............... 369/13.33, 369/13.13, 13.32, 13.02, 14, 15, 112.09, 369/112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| | | | |
|---|---|---|---|
| 6,768,556 B1 | 7/2004 | Matsumoto et al. | |
| 8,077,559 B1 * | 12/2011 | Miyauchi et al. | 369/13.33 |
| 2004/0081031 A1 | 4/2004 | Saga et al. | |
| 2006/0132972 A1 | 6/2006 | Tagami et al. | |
| 2010/0103553 A1 | 4/2010 | Shimazawa et al. | |
| 2011/0058272 A1 * | 3/2011 | Miyauchi et al. | 369/13.33 |
| 2011/0228419 A1 * | 9/2011 | Tanaka et al. | 369/13.33 |
| 2011/0286128 A1 * | 11/2011 | Tsutsumi et al. | 369/13.33 |
| 2011/0317528 A1 * | 12/2011 | Miyauchi et al. | 369/13.24 |
| 2012/0082016 A1 * | 4/2012 | Komura et al. | 369/13.33 |

* cited by examiner

*Primary Examiner* — Tan X Dinh
(74) *Attorney, Agent, or Firm* — Posz Law Group, PLC

(57) ABSTRACT

A thermally assisted magnetic head includes a magnetic pole that generates a writing magnetic field from an air bearing surface (ABS); a waveguide through which light propagates; and a plasmon generator generating near-field light from a near-field light generating end surface by coupling the light thereto in a surface plasmon mode. The magnetic pole includes a convex part protruding in a substantially V-shape along a light propagation direction of the waveguide. The plasmon generator includes a substantially V-shaped part contacting the convex part, and as seen from a side of the ABS, a thickness of the plasmon generator in a direction perpendicular to convex part contacting sides gradually increases from an end in a direction away from the waveguide, the convex part contacting sides being linear sides that form the substantially V-shaped part of the plasmon generator and contacting the convex part.

13 Claims, 12 Drawing Sheets

THERMALLY ASSISTED MAGNETIC RECORDING HEAD HAVING V-SHAPED PLASMON GENERATOR

BACKGROUND OF THE INVENTION

1. Field of the Invention

The present invention relates to a head for a thermally assisted magnetic recording that records data by emitting near-field (NF) light on a magnetic recording medium and by decreasing an anisotropic magnetic field of the magnetic recording medium.

2. Description of the Related Art

In the field of magnetic recording using a head and a medium, further improvements have been demanded in performance of thin film magnetic heads and magnetic recording media in view of an increase in recording density of magnetic disk devices. For the thin film magnetic heads, composite type thin film magnetic heads configured from lamination of a reading magnetoresistive (MR) element and a writing electromagnetic conversion element are being widely used.

The magnetic recording medium is a non-continuous medium, in which magnetic particles are aggregated. Each magnetic particle has a single magnetic domain. In this magnetic recording medium, a single recording bit is configured by a plurality of magnetic particles. Therefore, to increase magnetic density, the size of the magnetic particles must be reduced, and asperity at a border of adjacent recording bits needs to be minimized. However, if the size of the magnetic particles is reduced, there is a problem that thermal stability for magnetization of the magnetic particles is lowered as the volume of the magnetic particles is reduced.

To address this problem, increasing magnetic anisotropic energy Ku of magnetic particles may be considered. However, this increase in Ku causes an increase in anisotropic magnetic field (coercive force) of the magnetic recording medium. On the other hand, the upper limit of the writing magnetic field intensity for the thin film magnetic head is determined substantially by saturation magnetic flux density of a soft magnetic material forming a magnetic core in the head. As a result, when the anisotropic magnetic field of the magnetic recording medium exceeds an acceptable value determined from the upper value of the writing magnetic field intensity, writing becomes impossible. Currently, as a method to solve such a problem of thermal stability, a so-called thermally assisted magnetic recording method has been proposed, which, using a magnetic recording medium formed by a magnetic material with large Ku, performs the writing by heating the magnetic recording medium immediately before applying the writing magnetic field to reduce the anisotropic magnetic field.

For this thermally assisted magnetic recording method, a method that uses a near-field light probe, a so-called plasmon generator, which is a piece of metal that generates near-field light from plasmon excited by emission of laser light, is known. For example, a plasmon generator that includes a metal scatter having a shape of a cone or the like formed on a substrate is disclosed in U.S. Pat. No. 6,768,556.

In addition, a configuration is disclosed in U.S. Patent Publication No. 2004/081031 A1, in which a plasmon generator is formed at a position to contact the main magnetic pole of a perpendicular magnetic recording head so that an irradiated surface of the plasmon generator is perpendicular to the magnetic recording medium.

In the magnetic recording head including such a conventional plasmon generator, the information is written such that the near-field light generated at a near-field light generating portion of the plasmon generator heats the magnetic recording medium so as to decrease the anisotropic magnetic field. However, the heat caused by the generated near-field light at the near-field light generating portion is accumulated at the near-field light generating portion. As a result, there are problems that a near-field light generating end surface having the near-field light generating portion of the plasmon generator protrudes on the side of the magnetic recording medium, and that optical-power efficiency of the plasmon generator significantly decreases. Therefore, to address these problems, it is necessary to dissipate the heat from the near-field light generating portion.

In contrast, to efficiently perform the thermally assisted magnetic recording, it is preferable to arrange the near-field light generating portion of the plasmon generator and the magnetic pole adjacent to each other. That is, it is preferable to reduce the thickness of the plasmon generator as much as possible. However, if the thickness of the plasmon generator at the near-field light generating portion is reduced, the heat escapes from the near-field light generating portion to the side of the magnetic pole. As a result, there is a problem that degradation of the magnetic pole and the like are caused.

SUMMARY OF THE INVENTION

Before explaining the present invention, terminologies used in the present specification are defined. In a lamination structure of an element structure formed on an element formation surface of a slider substrate of a magnetic recording head according to embodiments of the present invention, from a reference layer or element, the substrate side is called "downward (lower direction)," and the opposite side is called "upward (upper direction)." In addition, in the magnetic recording head according to embodiments of the present invention, some of the drawings provide "X, Y and Z axis directions" if necessary. Here, the Z axis direction is the above-described "up and down directions."+Z side corresponds to a trailing side, and −Z side corresponds to a leading side. Moreover, the Y axis direction is a track width direction, and the X axis direction is a height direction.

The present invention has an object to provide a thermally assisted head that can suppress degradation of a magnetic pole by allowing the heat from a near-field light generating portion of a plasmon generator on the side of the magnetic pole.

To achieve the object, The present invention provides a thermally assisted magnetic head includes: a magnetic pole that generates a writing magnetic field from an end surface, which forms a part of a medium opposing surface that opposes a magnetic recording medium; a waveguide through which light for exciting surface plasmon propagates; a plasmon generator that is provided between the magnetic pole and the waveguide and that generates near-field light from a near-field light generating end surface that forms a part of the medium opposing surface by coupling the light thereto in a surface plasmon mode, wherein the magnetic pole includes a convex part that protrudes in a substantially V-shape along a light propagation direction of the waveguide on a waveguide opposing surface that opposes the waveguide, the plasmon generator includes a substantially V-shaped part that contacts the convex part, and as seen from a side of the medium opposing surface, a thickness of the plasmon generator in a direction perpendicular to convex part contacting sides gradually increases from an end positioned closest to the waveguide on the convex part contacting sides in a direction away from the waveguide, the convex part contacting sides being linear sides that form the substantially V-shaped part of the plasmon generator and contacting the convex part (First Invention).

Additionally, in the present invention, the plasmon generator is formed to at least contact two inclined surfaces of the convex part protruding in a substantially V-shape. The near-field light generating end surface means an end plane in a substantially V-shape of the plasmon generator and an end part that forms a part of the medium opposing surface. Further, the near-field light generating portion means a part of the near-field light generating end surface that is the closest to the waveguide (emitting point of the near-field light).

In the above invention (First Invention), it is preferred that a thickness of the plasmon generator in a direction from a second point toward a side of the waveguide is greater than a thickness of the plasmon generator in a direction from a first point toward the side of the waveguide; the first point is defined as a position, on the near-field light generating end surface, that is closest to the waveguide and that contacts the convex part, the second point is defined as a position away from the first point in a direction opposite from the light propagation direction (Second Invention).

In the above invention (First Invention), it is preferred that a ratio of a thickness D1 of the plasmon generator at the end in the direction perpendicular to the convex part contacting sides and a thickness D2 of the plasmon generator at another end of the convex part contacting sides in the direction perpendicular to the convex part contacting sides (D2/D1) is 1.05-3.0 (Third Invention).

In the above invention (First Invention), from the first view, it is preferred that the thickness of the plasmon generator in a direction from the first point towards the side of the waveguide is 10-50 nm (Fourth Invention).

In the above invention (First Invention), from the first view, it is preferred that a thickness of the plasmon generator in a direction towards the side of the waveguide from the first point to a third point, which is positioned between the first point and the second point, is substantially constant, and the thickness of the plasmon generator towards a side of the waveguide gradually increases from the third point to the second point (Fifth Invention).

In the present invention, each of the first to third points is a point on the plasmon generator that contacts the magnetic pole that is located at a position the closest to the waveguide. More specifically, these points mean the following.

The first point means a point on the plasmon generator that contacts the lowest part of the substantially V-shaped convex part when the convex part of the magnetic pole and the plasmon generator are viewed from the side of the medium opposing surface such that the waveguide is positioned below them.

The second point means a point on the plasmon generator, which is located at a part where the thickness of the plasmon generator that is the closest to the waveguide (thickness in the direction towards the waveguide) is the thickest and which is closest to the first point.

Further, the third point means a point on the plasmon generator, which is located at a part where the thickness of the plasmon generator that is the closest to the waveguide (thickness in the direction towards the waveguide) is substantially the same as the thickness at the first point and where such thickness starts increasing towards the second point.

In the above invention (Fifth Invention), it is preferred that a length from the first point to the third point is 10-300 nm (Sixth Invention).

In the above invention (First Invention), it is preferred that the plasmon generator includes wing-shaped widened parts, as seen from a side of the medium opposing surface, that are connected to another end side of the convex part contacting sides and that are bent outwardly and widen from the another end side of the convex part contacting sides having the substantial V-shape as a base (Seventh Invention).

In the above invention (Fifth Invention), it is preferred that surfaces of the plasmon generator that oppose the waveguide are flat surfaces that oppose the waveguide with a predetermined gap, and the plasmon generator includes: a propagative edge provided continuously from the first point to the third point, a tapered part provided continuously such that a width thereof is gradually widened from the third point to the second point, and a widened part provided to have a predetermined width from the second point in a direction opposite from the light propagation direction through the waveguide (Eighth Invention).

Further, the present invention provides a head gimbal assembly including: the thermally assisted magnetic recording head according to the above invention (First Invention); and a suspension that supports the thermally assisted magnetic recording head (Ninth Invention).

Furthermore, the present invention provides a magnetic recording device, including: a magnetic recording medium; the thermally assisted magnetic recording head according to claim 1; and a positioning device that supports and positions the thermally assisted magnetic recording head with respect to the magnetic recording medium (Tenth Invention).

According to the present invention, a thermally assisted magnetic recording head is provided that suppresses degradation of the magnetic pole by allowing the heat to escape from the near-field light generating point of the plasmon generator to the side of the magnetic pole.

DESCRIPTION OF THE PREFERRED EMBODIMENTS

A thermally assisted magnetic recording head according to an embodiment of the present invention is explained with reference to the drawings.

Figure 1:
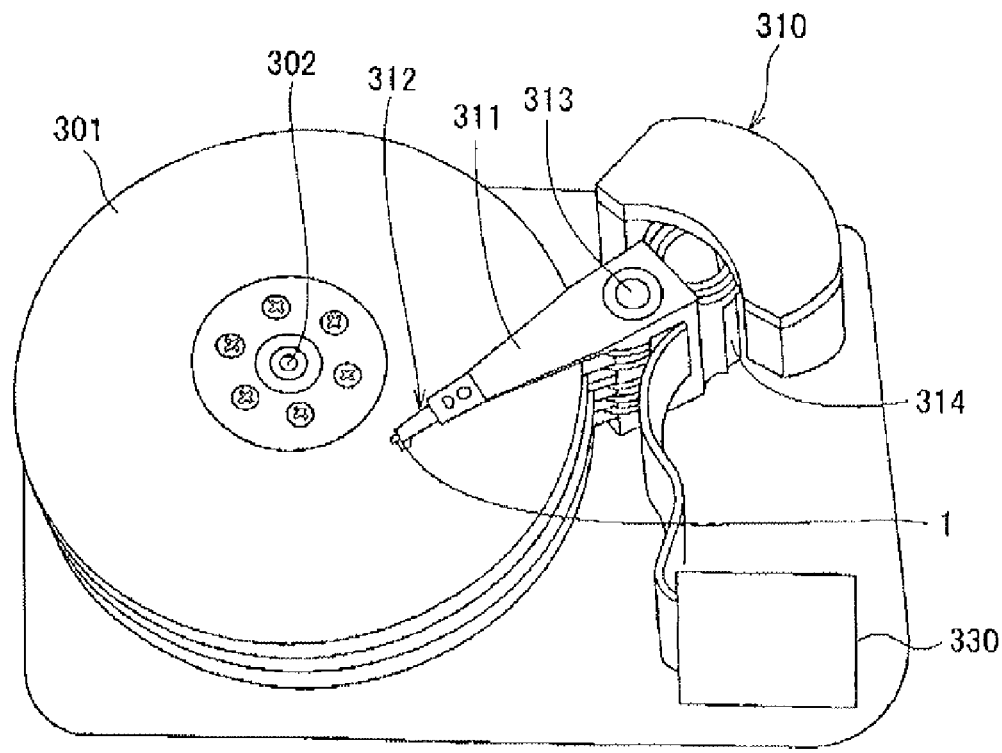
FIG. 1 is a perspective view schematically showing a magnetic recording device of an embodiment of the present invention.
Figure 2:
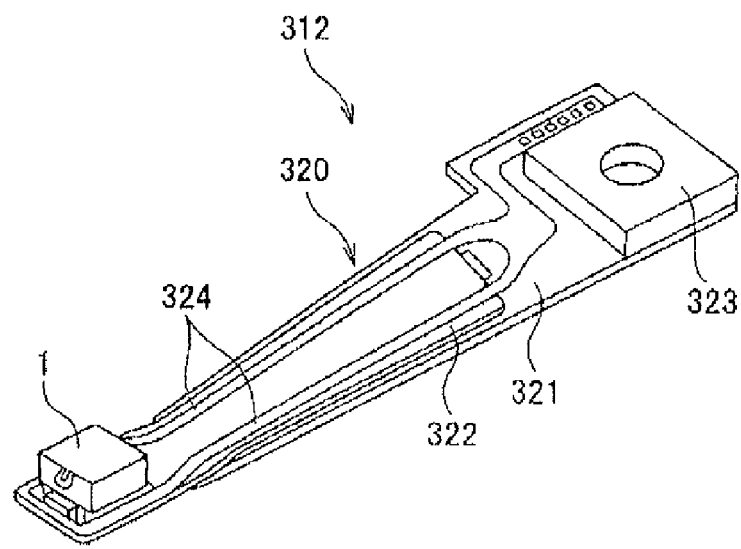
FIG. 2 is a perspective view schematically showing a head gimbal assembly (HGA) of an embodiment of the present invention.
Figure 3:
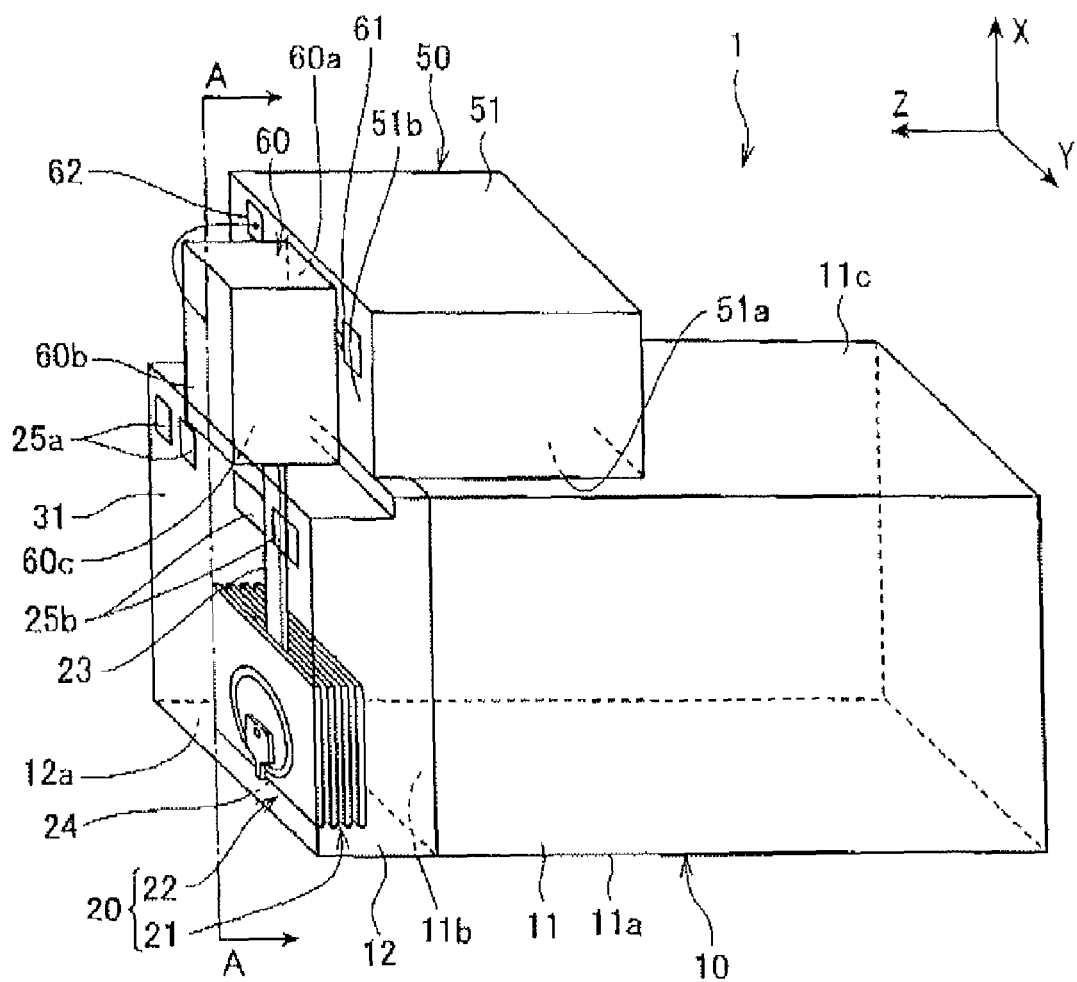
FIG. 3 is a perspective view showing a thermally assisted magnetic recording head according to an embodiment of the present invention.

FIG. 1 is a perspective view schematically showing a magnetic recording device of the present embodiment. FIG. 2 is a perspective view schematically showing a head gimbal assembly (HGA) of the present embodiment. FIG. 3 is a perspective view showing a thermally assisted magnetic recording head according to the present embodiment.

As shown in FIG. 1, a magnetic disk device, which is a magnetic recording device according to the present embodiment includes a plurality of magnetic disks 301 that rotate about a rotational axis of a spindle motor 302, an assembly carriage device 310 provided with a plurality of drive arms 311, a head gimbal assembly (HGA) 312 attached to a front end of each drive arm 311 and having a thermally assisted magnetic recording head 1, which is a thin film magnetic head, according to the present embodiment, and a control circuit 330 that controls writing and reading operations of the thermally assisted magnetic recording head 1 according to the present embodiment and that controls a light emission operation of a laser diode, which is a light source that generates laser light for the later-discussed thermally assisted magnetic recording.

In the present embodiment, the magnetic disks 301 are for perpendicular magnetic recording and have a configuration, in which a soft magnetic under layer, an intermediate layer and a magnetic recording layer (perpendicularly magnetized layer) are sequentially laminated on a disk substrate.

The assembly carriage device 310 is a device for positioning the thermally assisted magnetic recording head 1 on a track, which is formed on the magnetic disk 301 and on which recording bits are arrayed. In the assembly carriage device 310, the drive arms 311 are stacked in a direction along a pivot bearing shaft 313 and are angularly swingable by a voice coil motor (VCM) about the pivot bearing shaft 313.

The configuration of the magnetic disk device of the present embodiment is not limited to the above-described configuration but may include only a single set of the magnetic disk 301, the drive arm 311, the HGA 312 and the thermally assisted magnetic recording head 1.

In the HGA 312 shown in FIG. 2, a suspension 320 includes a load beam 321, a flexure 322 that is fixed to the load beam 321 and has elasticity, and a base plate 323 provided at a base of the load beam 321. In addition, a wiring member 324 formed from a lead conductor and a connection pads electrically connected to both sides of the lead conductor are provided on the flexure 322. The thermally assisted magnetic recording head 1 according to the present embodiment opposes a surface of the respective magnetic disk 301 with a predetermined space (flying height) and is fixed to the flexure 322 at the front end of the suspension 320. Further, an end of the wiring member 324 is electrically connected to a terminal electrode of the thermally assisted magnetic recording head 1 according to the present embodiment. The configuration of the suspension 320 in the present embodiment is also not limited to the above-described configuration but may include a head driving IC chip (not shown) attached to the middle of the suspension 320.

As shown in FIG. 3, the thermally assisted magnetic recording head 1 according to the present embodiment includes a slider 10 and a light source unit 50. The slider 10 is formed from ALTIC ($Al_2O_3$—TiC) or the like and includes a slider substrate 11 having an air bearing surface (ABS) 11a, which is a medium opposing surface, processed to obtain an appropriate flying height, and a head part 12 formed on an element formation surface 11b that is perpendicular to the ABS 11a.

Furthermore, the light source unit 50 is formed from ALTIC ($Al_2O_3$—TiC) or the like and includes a unit substrate 51 having a joining surface 51a, and a laser diode 60, which is a light source provided on the light source installation surface 51b that is perpendicular to the joining surface 51a.

The slider 10 and the light source unit 50 are mutually joined by bonding a back surface 11c of the slider substrate 11 and the joining surface 51a of the unit substrate 51. In addition, the back surface 11c of the slider substrate 11 means an end surface opposite from the ABS 11a of the slider substrate 11. The thermally assisted magnetic recording head 1 according to the present embodiment may have a configuration, in which the laser diode 60 is directly attached to the slider 10 without the light source unit 50.

The head part 12 formed on the element formation surface 11b of the slider substrate 11 of the slider 10 includes a head element 20 that has an MR element 21 for reading out data from the magnetic disk 301 and an electromagnetic conversion element 22 for writing data on the magnetic disk 301, a waveguide 23 for guiding the laser light from the laser diode 60 provided on the light source unit 50 to the side of the medium opposing surface, a plasmon generator 24 that forms a near-field light generating optical system with the waveguide 23, a passivation layer 31 formed on the element formation surface 11b to cover the MR element 21, the electromagnetic conversion element 22, the waveguide 23 and the plasmon generator 24, a pair of first terminal electrodes 25a that are exposed from the upper surface of the passivation layer 31 and that are electrically connected to the MR element 21, and a pair of second terminal electrodes 25b that are exposed from the upper surface of the passivation layer 31 and that are electrically connected to the electromagnetic conversion element 22. The first and second terminal electrodes 25a and 25b are electrically connected to the connection pad of the wiring member 324 provided to the flexure 322 (FIG. 2).

Ends of the MR element 21, the electromagnetic conversion element 22 and the plasmon generator 24 reach a head part end surface 12a, which is the medium opposing surface of the head part 12. The head part end surface 12a and the ABS 11a form the entire medium opposing surface for the thermally assisted magnetic recording head 1 according to the present embodiment.

During the actual writing and reading of data, the thermally assisted magnetic recording head 1 hydrodynamically flies on the surface of the rotating magnetic disk 301 with a predetermined flying height. At this time, the end surfaces of the MR element 21 and the electromagnetic conversion element 22 oppose the surface of the magnetic recording layer of the magnetic disk 301 with an appropriate magnetic spacing. In this state, the MR element 21 reads data by sensing a data signal magnetic field from the magnetic recording layer, and the electromagnetic conversion element 22 writes data by applying the data signal magnetic field to the magnetic recording layer. At the time of writing data, the laser light propagated from the laser diode 60 of the light source unit 50 through the waveguide 23 is coupled with the plasmon generator 24 in a surface plasmon mode and excites a surface plasmon at the plasmon generator 24. This surface plasmon propagates along the later-discussed propagation edge provided at the plasmon generator 24 towards the head part end surface 12a so that the near-field light is generated at the end of the plasmon generator 24 on the side of the head part end surface 12a. This near-field light heats a part of the magnetic recording layer of the magnetic disk 301 as it reaches the surface of the magnetic disk 301. As a result, anisotropic magnetic field (coercive force) at that part decreases to a value at which the writing becomes possible. Thermally assisted magnetic recording can be achieved by applying a writing magnetic field to the part where the anisotropic magnetic field has decreased.

Figure 4:
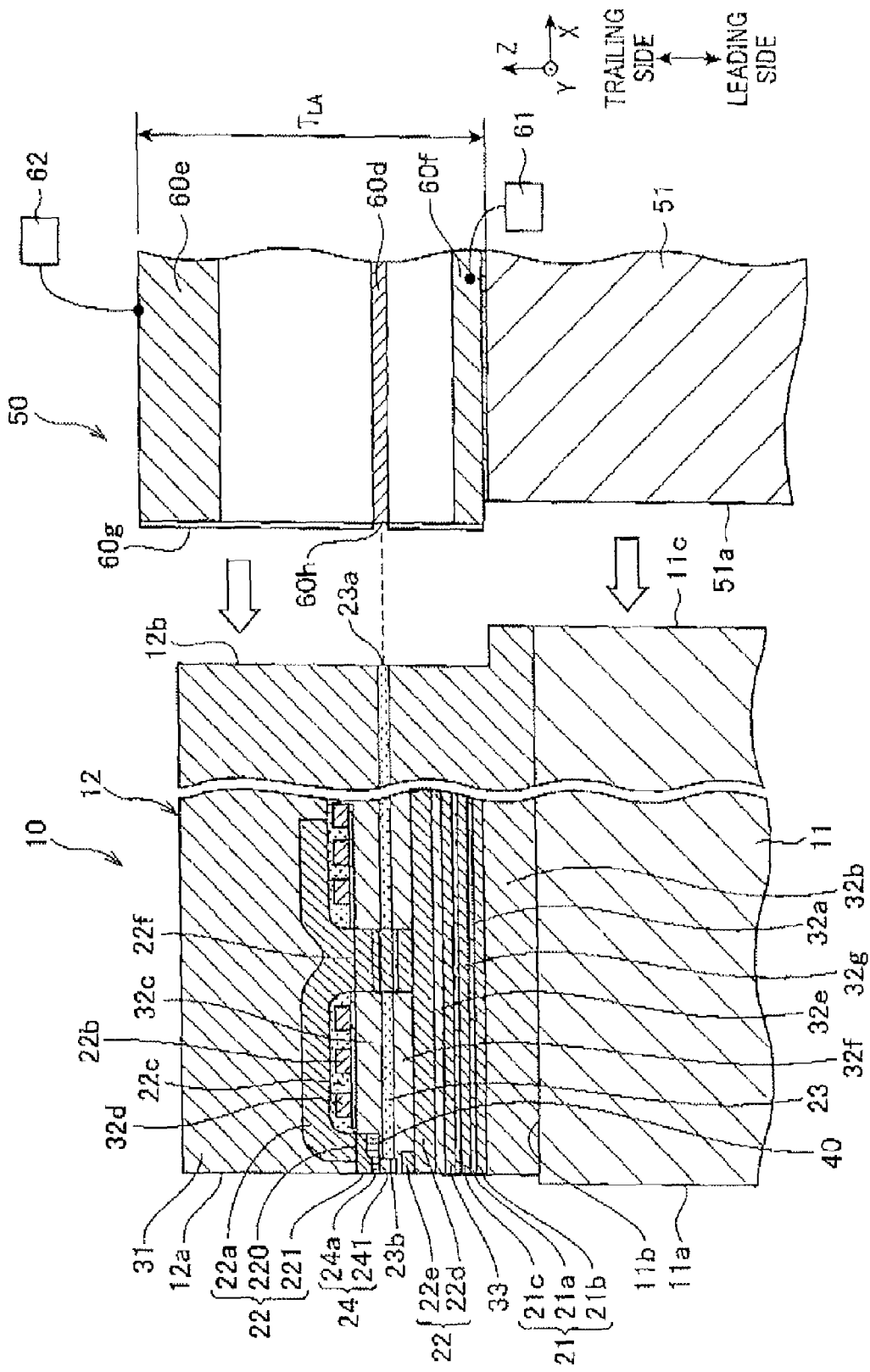
FIG. 4 is a cross-sectional view from an A-A line (XZ plane) in FIG. 3 that schematically shows a configuration of a main part of the thermally assisted magnetic recording head according to an embodiment of the present invention.

FIG. 4 is a cross-sectional view from an A-A line (XZ plane) in FIG. 3 that schematically shows a configuration of a main part of the thermally assisted magnetic recording head 1 according to the present embodiment.

As shown in FIG. 4, the MR element 21 includes an MR multilayer 21a, a lower shield layer 21b and an upper shield layer 21c. The lower shield layer 21b and the upper shield layer 21c are arranged as a pair to sandwich the MR multilayer 21a and a first insulation layer 32a. The MR element 21 is formed on a second insulation layer 32b, which is formed on the element formation surface 11b. The lower shield layer 21b and the upper shield layer 21c prevent the MR multilayer 21a from being affected by an external magnetic field that becomes a noise.

The lower shield layer 21b and the upper shield layer 21c are magnetic layers with a thickness of approximately 0.5-3 µm formed by a frame plating method or a spattering method, for example, and are formed by a soft magnetic material, such as NiFe (Permalloy), FeSiAl (Sendust), CoFeNi, CoFe, FeN, FeZrN, CoZrTaCr or the like, or a multilayer formed by these materials.

The MR multilayer 21a is a magnetically sensitive part that senses the signal magnetic field using the MR effect and may be any of a current-in-plane giant magnetoresistive (CIP-GMR) multilayer that uses a current-in-plane giant magnetoresistive effect, a current-perpendicular-to-plane giant magnetoresistive (CPP-GMR) multilayer that uses a current-perpendicular-to-plane giant magnetoresistive effect, and a tunnel-magnetoresistive (TMR) multilayer that uses a tunnel magnetoresistive effect. If the MR multilayer 21a is a CPP-GMR multilayer or a TMR multilayer, the lower shield layer 21b and the upper shield layer 21c function as electrodes also. On the other hand, if the MR multilayer 21a is a CIP-GMR multilayer, insulation layers are provided between the MR multilayer 21a and each of the lower shield layer 21b and the upper shield layer 21c. Moreover, an MR lead layer that is electrically connected to the MR multilayer 21a is provided.

If the MR multilayer 21a is a TMR multilayer, the MR multilayer 21a has a configuration in which the following are sequentially laminated: an antiferromagnetic layer of IrMn, PtMn, NiMn, RuRhMn or the like having a thickness of approximately 5-15 nm; a magnetization pinned layer that has a configuration in which two ferromagnetic layers of CoFe or the like sandwich a nonmagnetic metal layer of Ru or the like and in which a magnetization direction is pinned by the antiferromagnetic layer; a tunnel barrier layer of a nonmagnetic dielectric material in which a metal film of Al, AlCu or the like having a thickness of 0.5-1 nm is oxidized by oxygen introduced in a vacuum device or by natural oxidation; and a magnetization free layer that is formed by a layer of CoFe or the like having a thickness of approximately 1 nm and a layer of NiFe or the like having a thickness of approximately 3-4 nm, which are ferromagnetic materials, and that achieves tunnel exchange coupling with the magnetization pinned layer through the tunnel barrier layer.

The electromagnetic conversion element 22 is for perpendicular magnetic recording and includes an upper yoke layer 22a, a main magnetic pole 220, a writing coil layer 22b, a coil insulation layer 22c, a lower yoke layer 22d and a lower shield 22e.

The upper yoke layer 22a is formed to cover the coil insulation layer 22c. The main magnetic pole 220 is formed in a third insulation layer 32c made of an insulation material, such as $Al_2O_3$ (alumina). These upper yoke layer 22a and main magnetic pole 220 are magnetically connected to each other and form a waveguide for guiding, while accommodating, a magnetic flux generated by applying a writing current to the writing coil layer 22b, to the magnetic recording layer (perpendicular magnetization layer) of the magnetic disk 301 in which the writing is performed. Of these, the main magnetic pole 220 extends to the head part end surface 12a. Of an end surface 221 of the main magnetic pole 220 that forms a part of the head part end surface 12a, a vertex closest to the lower shield 22e (furthest to the reading side) is a point where the writing magnetic field is generated. As a result, by forming the main magnetic pole 220 to have the minute point for generating the writing magnetic field, generation of a minute writing magnetic field that achieves the high recording density becomes possible.

The main magnetic pole 220 is preferably formed by a soft magnetic material having a higher saturation magnetic flux density than the upper yoke layer 22a. For example, the main magnetic pole 220 is formed by a soft magnetic material, such as FeNi, FeCo, FeCoNi, FeN or FeZrN, which are ferroalloy materials having Fe as main component. The thickness of the main magnetic pole 220 is 0.1-0.8 µm.

The writing coil layer 22b is formed on a fourth insulation layer 32d made of an insulation material, such as $Al_2O_3$ (alumina), that is formed on the third insulation layer 32c, such that the writing coil layer 22b passes at least between the lower yoke layer 22d and the upper yoke layer 22a in a single turn. The writing coil layer 22b has a spiral configuration that winds about a back contact part 22f. The writing coil layer 22b is formed by a conductive material, such as Cu (copper). A writing coil insulation layer 22c formed by an insulation material, such as a thermally cured photoresist covers the writing coil layer 22b and electrically insulates between the writing coil layer 22b and the upper yoke layer 22a. The writing coil layer 22b has a single layer in the present embodiment. However, there may be two or more layers and it may be a helical coil arranged to sandwich the upper yoke layer 22a. Moreover, the number of turns for the writing coil layer 22b is not particularly limited and may be set to 2-7 turns.

A through hole extending in the X axis direction is provided at the back contact part 22f. The waveguide 23 and an insulation layer that covers the waveguide 23 pass through the through hole. In this through hole, an inner wall of the back contact part 22f and the waveguide 23 are separated by a predetermined distance, such as at least 1 μm. As a result, the light propagated through the waveguide is prevented from being absorbed by the back contact part 22f.

The lower yoke layer 22d is formed on a fifth insulation layer 32e formed of an insulation material, such as $Al_2O_3$ (alumina) and functions as a waveguide that guides a magnetic flux that returns from a soft magnetic under layer provided under the magnetic recording layer (perpendicular magnetization layer) of the magnetic disk 301. The lower yoke layer 22d is formed by a soft magnetic material and has a thickness of approximately 0.5-5 μm, for example.

The lower shield 22e is a magnetic shield that is magnetically connected to the lower yoke layer 22d and extends to the head part end surface 12a. The lower shield 22e is provided on the other side from the main magnetic pole 220 as seen from the plasmon generator 24 and opposes the main magnetic pole 220 across the plasmon generator 24. The lower shield 22e functions to take in the magnetic flux that is generated and diverged from the main magnetic pole 220. The lower shield 22e has a width in the track width direction that is significantly larger than that of the main magnetic pole 220. By providing such a lower shield 22e, the magnetic gradient becomes steep between the end of the lower shield 22e and the main magnetic pole 220. As a result, a jitter of the signal output becomes small, and a reading error rate decreases. The lower shield 22e has a high saturation magnetic flux density. The lower shield 22e is preferably formed by NiFe (Permalloy) or a ferroalloy material and the like that is similar to the main magnetic pole 220.

The waveguide 23 and the plasmon generator 24 are provided between the lower yoke layer 22d (lower shield 22e) and the upper yoke layer 22a (main magnetic pole 220) and form an optical system for generating near-field light in the head part 12. The waveguide 23 is in parallel with the element formation surface 11b and extends from a rear end surface 23a that forms a part of a head part rear end surface 12b to the end surface 23b on the side of the head part end surface 12a. In addition, a part of the upper surface (side surface) of the waveguide 23 and a part of the lower surface of the plasmon generator 24 (including the propagation edge 241) oppose each other with a predetermined gap. A part that is sandwiched between those parts forms a buffer portion 40 that has a lower refractive index than the refractive index of the waveguide 23.

This buffer portion 40 functions to couple the laser light propagated through the waveguide 23 to the plasmon generator 24 in the surface plasmon mode. The buffer portion 40 may be a part of a sixth insulation layer 32f that is a part of the passivation layer 31 or may be another layer provided separately from the sixth insulation layer 32f.

The plasmon generator 24 is positioned between the waveguide 23 and the main magnetic pole 220 and includes a near-field light generating end surface 24a that forms a part of the head part end surface 12a. In addition, the plasmon generator 24 includes a propagative edge 241 that opposes the waveguide 23 across the buffer portion 40 and that extends to the near-field light generating end surface 24a. The propagative edge 241 functions to propagate the surface plasmon excited by the laser light propagated through the waveguide 23 (waveguide light). The plasmon generator 24 couples the waveguide light in the surface plasmon mode, propagates the surface plasmon on the propagative edge 241, and generates the near-field light from the near-field light generating end surface 24a. The vertex of the propagative edge 241 may be rounded to prevent a phenomenon that the surface plasmon escapes from the propagative edge 241. In that case, the curvature radius of the rounded vertex is preferably set to a range of 6.25-20 nm, for example.

The main magnetic pole 220 contacts a surface part of the plasmon generator 24 excluding the propagative edge 241. In other words, the main magnetic pole 220 contacts all of the side surfaces of the plasmon generator 24 that do not form the propagative edge 241 on a border thereof. Because the main magnetic pole 220 contacts the surface of the plasmon generator 24 as discussed above, the distance, which is between the end surface 221 of the main magnetic pole 220 that generates the writing magnetic field and the near-field light generating end surface 24a of the plasmon generator 24, is zero. In contrast, the propagative edge 241 of the plasmon generator 24 does not contact the main magnetic pole 220 at all. Therefore, the excited surface plasmon is propagated on the propagative edge 241 without being absorbed by the main magnetic pole 220. As a result, the near-field light emission point on the near-field light generating end surface 24a of the plasmon generator 24 is the vertex of the near-field light generating end surface 24a, which is the terminal end of the propagative edge 241 that does not contact the main magnetic pole 220 at all. Therefore, this near-field light emission point can be accurately set at a position sufficiently close to the end surface 221 of the main magnetic pole 220 that generates the writing magnetic field.

In the present embodiment, the plasmon generator 24 is formed to contact two sloped surfaces of the later-discussed convex part 222. In addition, the near-field light generating end surface 24a means an end surface that has a substantial V-shape on the plasmon generator 24 and that forms a part of the ABS 11a. Moreover, the near-field light generation part means a part of the near-field light generating end surface 24a that is closest to the waveguide 23 (near-field light emission point).

Configurations of the waveguide 23, the buffer portion 40, the plasmon generator 24 and the main magnetic pole 220 are described in detail later using FIG. 5. Further, it is preferable that an interelement shield layer 33 that is sandwiched by the fifth and the seventh insulation layers 32e and 32g is provided between the MR element 21 and the electromagnetic conversion element 22, as described in the present embodiment. The interelement shield layer 33 may be formed by a soft magnetic material and functions to shield the MR element 21 from the magnetic field generated by the electromagnetic conversion element 22.

As shown in FIG. 4, the light source unit 50 includes the unit substrate 51, the laser diode 60 provided on the light source installation surface 51b of the light source unit 50, a first drive terminal electrode 61 electrically connected to an electrode that forms a lower surface 60a of the laser diode 60, and a second drive terminal electrode 62 electrically connected to an electrode that forms an upper surface 60b of the laser diode 60. The first and second drive terminal electrodes 61 and 62 are electrically connected to the connection pads of the wiring member 324 provided at the flexure 322 (FIG. 2). When a predetermined voltage is applied to the laser diode 60 via the first and second drive terminal electrodes 61 and 62, laser light is emitted from an emission center located on an emission surface 60c of the laser diode 60. In the head structure shown in FIG. 4, an oscillation direction of the electric field of laser light that the laser diode 60 generates is preferably perpendicular (Z axis direction) to a lamination layer plane of an active layer 60d. That is, it is preferable that the laser light which the laser diode 60 generates is a TM-mode polarized light. As a result, the laser light propagated through the waveguide 23 can be coupled to the plasmon generator 24 in the surface plasmon mode through the buffer portion 40.

For the laser diode 60, InP-type, GaAs-type, and GaN-type diodes etc. may be used that are generally used for communication, optical disk storage, material analysis or the like. The wavelength $\lambda_L$ for the emitted laser light may be in a range of 375 nm-1.7 µm, for example.

More specifically, an InGaAsP/InP4 quaternary laser diode, of which the available wavelength region is considered to be 1.2-1.67 µm, for example, may be used. The laser diode 60 has a multilayer structure that includes the upper electrode 60e, the active layer 60d and the lower electrode 60f. Reflection layers for exciting the oscillation by total reflection are formed on cleavage surfaces of this multilayer structure. In a reflection layer 60g, an opening is provided at a position of the active layer 60d that includes the emission center 60h. A thickness $T_{LA}$ of the laser diode 60 is approximately 60-200 µm, for example.

A power source in the magnetic disk device may be used for driving the laser diode 60. Magnetic disk devices normally have a power source of approximately 2 V, for example, which has a sufficient voltage for operating the laser oscillation. In addition, power consumption of the laser diode 60 is approximately several tens of mW, for example, which can be sufficiently covered by the power source in the magnetic disk device. By applying a predetermined voltage by such a power source between the first drive terminal electrode 61 that is electrically connected to the lower electrode 60f and the second drive terminal electrode 62 that is electrically connected to the upper electrode 60e, and by oscillating the laser diode 60, the laser light is emitted from the opening that includes the emission center 60a in the reflection layer 60g. The laser diode 60 and the first and second drive terminal electrodes 61 and 62 are not limited to the above-discussed embodiment. For example, the electrodes may be turned upside down in the laser diode 60, and the upper electrode 60e may be bonded to the light source installation surface 51b of the unit substrate 51. Furthermore, a laser diode may be provided on the element formation surface 11b of the thermally assisted magnetic recording head 1, and such a laser diode and the waveguide 23 may be optically connected. Moreover, an emission center of a laser diode provided in the magnetic disk device and the rear end surface 23a of the waveguide 23 may be connected by an optical fiber or the like, for example, without providing the laser diode 60 in the thermally assisted magnetic recording head 1.

In addition, the sizes of the slider 10 and the light source unit 50 may be arbitrary. For example, the slider 10 may be a femto slider, which has a width of 700 µm in the track width direction (Y axis direction), a length of 850 µm (in Z axis direction) and a thickness of 230 µm (in X axis direction). In this case, the light source unit 50 may be a size slightly smaller than the slider, which may have a width of 425 µm, a length of 300 µm and a thickness of 300 µm.

By connecting the above-described light source unit 50 and slider 10, the thermally assisted magnetic recording head 1 is configured. For this connection, the contact surface 51a of the unit substrate 51 and the rear surface 11c of the slider substrate 11 are in contact. At this time, the unit substrate 51 and the slider substrate 11 are positioned so that the laser light generated from the laser diode 60 enters the rear end surface 23a of the waveguide 23 that is opposite from the ABS 11a.

Figure 5:
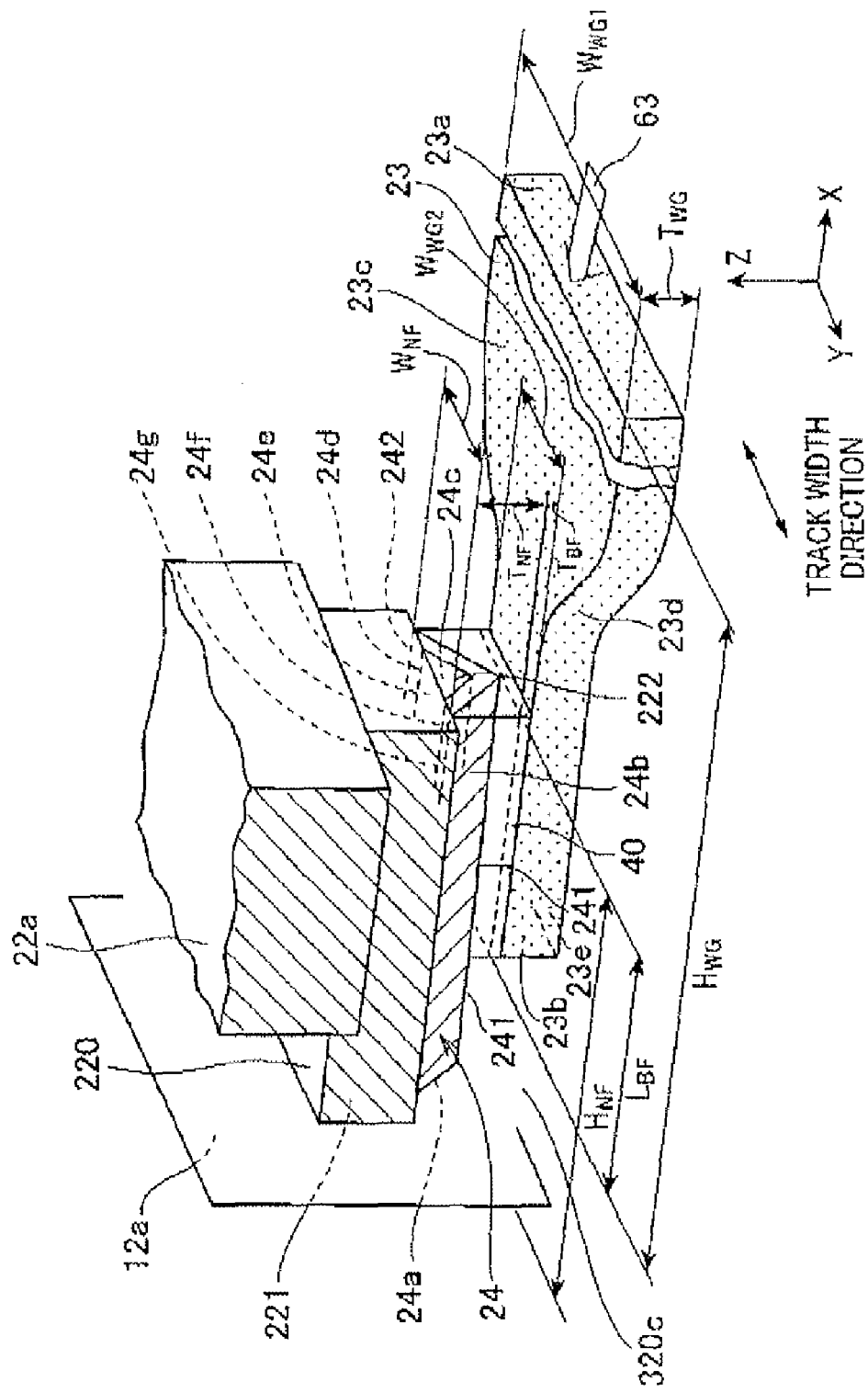
FIG. 5 is a perspective view schematically showing a configuration of a waveguide, a plasmon generator and a main magnetic pole in the thermally assisted magnetic recording head according to an embodiment of the present invention.

FIG. 5 is a perspective view schematically showing a configuration of the waveguide 23, the plasmon generator 24 and the main magnetic pole 220 in the thermally assisted magnetic recording head 1 according to the present embodiment. In this figure, the head part end surface 12a that includes positions from which the writing magnetic field and the near-field light are irradiated to the magnetic recording medium is positioned on the left side of the drawing.

As shown in FIG. 5, in the thermally assisted magnetic recording head 1 according to the present embodiment, the waveguide 23 for propagating the laser light 63 for generating the near-field light, and the plasmon generator 24 having the propagative edge 241, which is the edge that propagates the surface plasmon generated by the laser light (waveguide light) 63, are provided. The plasmon generator 24 includes the near-field light generating end surface 24a that extends to the head part end surface 12a. In addition, the part sandwiched by a part of the side surface 23c of the waveguide 23 and a part of the lower surfaces (side surfaces) 24b and 24c of the plasmon generator 24 including the propagative edge 241 form the buffer portion 40. That is, the propagative edge 241 is surrounded by the buffer portion 40. This buffer portion 40 couples the laser light (waveguide light) 63 to the plasmon generator 24 in the surface plasmon mode. In addition, the propagative edge 241 propagates the surface plasmon excited by the laser light (waveguide light) 63 to the near-field light generating end surface 24a.

The side surfaces of the plasmon generator 24 represents end surfaces 24d, 24e, 24f and 24g, excluding the near-field light generating end surface 24a and the end surface that is opposite from the end surface 24a in the X axis direction. In addition, the side surfaces of the waveguide 23 include end surfaces 23c, 23d and 23e, excluding the end surface 23b of the head side end surface 12a and the rear end surface 23a opposite from the end surface 23b. The side surfaces of the waveguide 23 totally reflect the propagated laser light (waveguide light) 63 in the waveguide 23, which corresponds to a core. In the present embodiment, the side surface 23c of the waveguide 23, part of which contacts the buffer portion 40, is the upper surface of the waveguide 23.

More specifically, the laser light (waveguide light) 63 that has advanced to the vicinity of the buffer portion 40 induces the surface plasmon mode at the propagative edge 241 of the plasmon generator 24 as it is coupled to the optical structure formed by the waveguide 23 having a predetermined refractive index $n_{WG}$, the buffer portion 40 having a predetermined refractive index $n_{BF}$, and the plasmon generator 24 made of a conductive material, such as metal. That is, the laser light (waveguide light) 63 is coupled to the plasmon generator 24 in the surface plasmon mode. This induction of the surface plasmon mode is achieved by setting the refractive index $n_{BF}$ of the buffer portion 40 to be smaller than the refractive index $n_{WG}$ of the waveguide 23 ($n_{BF} < n_{WG}$). Actually, evanescent light is excited in the buffer portion 40 based on the condition of the optical interface between the waveguide 23, which is the core, and the buffer portion 40. Then, the surface plasmon mode is induced as the evanescent light and a fluctuation of charges excited at the surface (propagative edge 241) of the plasmon generator 24 are coupled, and the surface plasmon 70 is excited. The propagative edge 241 is located closest to the waveguide 23 on the sloped lower surfaces (side surfaces) 24b and 24c of the plasmon generator 24. In addition, because the propagative edge 241 forms an angular part, the electric field is easily focused, thereby allowing easy excitation of the surface plasmon 70.

As shown in FIG. 5, in the plasmon generator 24, which forms a triangular prism extending substantially in the X axis direction, a substantially V-shaped groove 242 extending to the near-field light generating end surface 24a is provided on an upper surface opposite from the propagative edge 241. Wall surfaces of the groove 242 form the side surfaces 24e and 24f. Further, a part of the main magnetic pole 220 is embedded in this groove 242. The groove 242 is filled with such part of the main magnetic pole 220. That is, the main magnetic pole 220 includes a convex part 222 that protrudes in a substantial V-shape along the propagation direction of the laser light (waveguide light) 63 on the surface opposing the waveguide 23 (waveguide opposing surface). The plasmon generator 24 is disposed to contact the convex part 222.

Since a part of the main magnetic pole 220 is embedded in the groove 242, the main magnetic pole 220 contacts all of the side surfaces 24d, 24e, 24f and 24g of the plasmon generator 24 that do not include a side forming the propagative edge 241. The side surfaces 24b and 24c of the plasmon generator 24 each include a side forming the propagative edge 241.

As discussed above, the main magnetic pole 220 contacts the surface of the plasmon generator 24. Therefore, there is no distance between the end surface 221 of the main magnetic pole 220 that generates the writing magnetic field and the near-field light generating end surface 24a of the plasmon generator 24. On the other hand, the propagative edge 241 of the plasmon generator 24 is the only side among all of the sides configuring the plasmon generator 24 (sides in the X axis direction) that is separated from the main magnetic pole 220. Therefore, the excited surface plasmon is propagated on the propagative edge 241 without being absorbed by the main magnetic pole 220. As a result, the emission point for the near-field light on the near-field light generating end surface 24a of the plasmon generator 24 is one of the vertexes of the near-field light generating end surface 24a, which is the terminal end of the propagative edge 241 that does not contact the main magnetic pole 220. By proving a condition that only the propagative edge 241 is not covered by or does not contact the main magnetic pole 220, the surface plasmon can be deliberately propagated on the propagative edge 241, thereby allowing the writing magnetic field to be accurately established at a position of the vertex that is sufficiently close to the end surface 221 of the main magnetic pole 220.

The plasmon generator 24 is preferably formed of a conductive material, such as a metal (e.g., Pd, Pt, Rh, Ir, Ru, Au, Ag, Cu or Al) or an alloy made of at least two types of these metals.

The waveguide 23 is provided on the −Z side (reading side) of the plasmon generator 24, that is, provided to sandwich the plasmon generator 24 with the main magnetic pole 220. With this configuration, the waveguide 23 can be separated from the main magnetic pole 220 even when the end surface 221 of the main magnetic pole 220 that generates the writing magnetic field and the near-field light generating end surface 24a that generates the near-field light are contacting with each other. As a result, a case can be avoided, in which the amount of light to be converted to the near-field light decreases as a part of the laser light (waveguide light) 63 is absorbed by the main magnetic pole 220 formed by metal.

Regarding the shape of the waveguide 23, the width in the track width direction (Y axis direction) may be constant. However, the width of a part of the waveguide 23 on the side of the head part end surface 12a may be narrower in the track width direction (Y axis direction) as shown in FIG. 5. The width $W_{WG1}$ in the track width direction (Y axis direction) at a part of the rear end surface 23a that is on the opposite side from the head part end surface 12a of the waveguide 23 is approximately 0.5-20 µm, for example. The width $W_{WG2}$ in the track width direction (Y axis direction) at the part on the side of the end surface 23b is approximately 0.3-100 µm, for example. The thickness $T_{WG}$ of the part on the side of the rear end surface 23a (in the Z axis direction) is approximately 0.1-4 µm, for example. The height (length) $H_{WG}$ (in the X axis direction) is approximately 10-300 µm, for example.

In addition, the side surfaces of the waveguide 23, that is, the upper surface 23c, the lower surface 23e and both side surfaces 23d in the track width direction (Y axis direction) contact the passivation layer 31 (FIG. 3), that is, the second insulation layer 23b and the sixth insulation layer 32f (FIG. 4), except the part that contacts the buffer portion 40. The waveguide 23 is configured from a material formed by spattering or the like, that has a refractive index $n_{WG}$, which is higher than the refractive index $n_{OC}$ of the material forming the passivation layer 31. For example, if the wavelength $\lambda_L$ of the laser light is 600 nm, and if the passivation layer 31 is formed by $SiO_2$ (silicon dioxide; n=1.46), the waveguide 23 may be formed by $Al_2O_3$ (alumina; n=1.63). In addition, if the passivation layer 31 is formed by $Al_2O_3$ (n=1.63), the waveguide 23 may be formed by $SiO_xN_Y$ (n=1.7~1.85), $Ta_2O_5$ (n=2.16), $Nb_2O_5$ (n=2.33), TiO (n=2.3~2.55) or $TiO_2$ (n=2.3~2.55). By forming the waveguide 23 with such materials, passivation loss of the laser light (waveguide light) 63 can be suppressed with excellent optical characteristics that the materials have themselves. Further, while the waveguide functions 23 as a core, the passivation layer 31 functions as a cladding, thereby establishing the condition for total reflection by the entire side surfaces. As a result, more laser light (waveguide light) 63 reaches the position of the buffer portion 40, and thus, the propagation efficiency of the waveguide 23 increases. In the present embodiment, a part of the propagative edge 241 that does not oppose the waveguide 23 (buffer portion 40) may be covered by a material forming the passivation layer 31, such as a part 320c of the third insulation layer 32c, that has a predetermined refractive index $n_{OC}$.

Further, the waveguide 23 may have a multilayer structure of dielectric materials and may have a configuration that the refractive index n increases in the upper layers. For example, such a multilayer structure may be established by sequentially laminating dielectric materials based on $SiO_xN_Y$ as a composition ratio for X and Y is appropriately varied. The number of laminated layers may be 8-12, for example. As a result, if the laser light (waveguide light) 63 is linearly polarized light in the Z axis direction, the laser light (waveguide light) 63 can be propagated to the side of the buffer portion 40 along the Z axis direction. At that time, by selecting the composition of each layer in the multilayer structure, the layer thickness and the number of layers, the desired propagative position for the laser light (waveguide light) 63 in the Z axis direction can be obtained.

The width $W_{NF}$ in the track width direction (Y axis direction) of the upper surface 242 of the plasmon generator 24 is smaller enough than the wavelength of the laser light (waveguide light) 63 and is approximately 10-100 nm, for example. The thickness $T_{NF}$ is also smaller enough than the wavelength of the laser light 63 and is approximately 10-100 nm, for example. The length (height) $H_{NF}$ (in the X axis direction) is approximately 0.8-6.0 µm, for example.

The buffer portion 40 is formed by a dielectric material that has a lower refractive index $n_{BF}$ than the refractive index $n_{WG}$ of the waveguide 23. If the wavelength $\lambda_L$ of the laser light is 600 nm, and if the waveguide 23 is formed by $Al_2O_3$ (alumina; n=1.63), the buffer portion 40 may be formed by $SiO_2$ (silicon dioxide; n=1.46). In addition, if the waveguide 23 is formed by $Ta_2O_5$ (n=2.16), the buffer portion 40 may be formed by $SiO_2$ (n=1.46) or $Al_2O_3$ (n=1.63). In these cases, the buffer portion 40 may be configured as a part of the passivation layer 31 (FIG. 3), which is formed by $SiO_2$ (n=1.46) or $Al_2O_3$ (n=1.63) and functions as a cladding. Moreover, the length $L_{BF}$ (in the X axis direction) of the buffer portion 40, which is sandwiched by the side surface 23c of the waveguide 23 and the propagative edge 241, is preferably 0.5-5 μm and is preferably larger than the wavelength $\lambda_L$ of the laser light (waveguide light) 63. In such a case, the buffer portion 40 becomes a significantly larger area compared to the so-called "focal area" that is formed when the laser light is concentrated at the buffer portion 40 and the plasmon generator 24 for coupling in the surface plasmon mode. Therefore, coupling in the extremely stable surface plasmon mode becomes possible. The thickness $T_{BF}$ (in the Z axis direction) of the buffer portion 40 is preferably 10-200 nm. These length $L_{BF}$ and thickness $T_{BF}$ of the buffer portion 40 are important parameters for achieving appropriate excitation and propagation for the surface plasmon.

The plasmon generator 24 that is formed by a metal material contacts the main magnetic pole 220 that is also formed of a metal material. As a result, the plasmon generator 24 is not electrically isolated, thereby preventing negative effects caused by electrostatic discharge (ESD).

Figure 6:
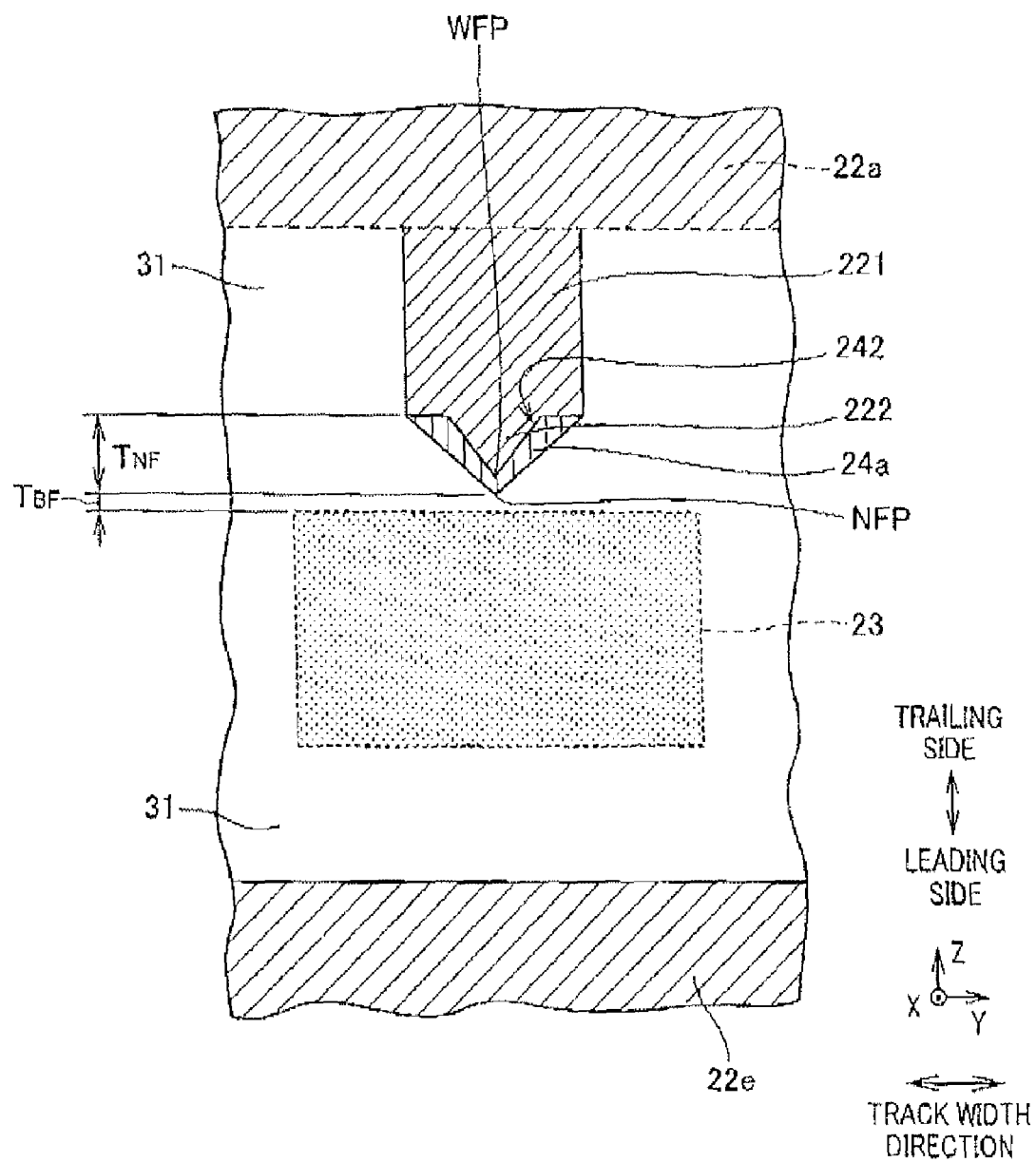
FIG. 6 is a plan view showing a configuration of, or near, a head part end surface formed by the waveguide, the plasmon generator and an electromagnetic conversion element in the thermally assisted magnetic recording head according to an embodiment of the present invention.
Figure 7:
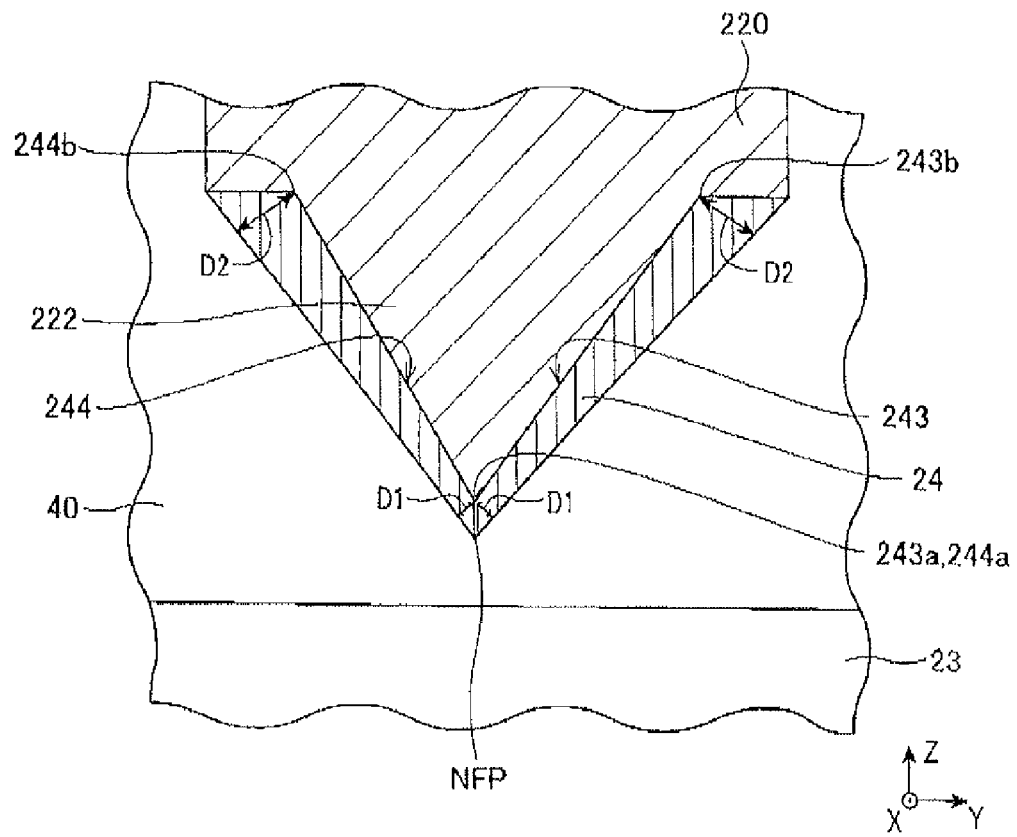
FIG. 7 is a plan view showing a configuration of, or near, the head part end surface of the plasmon generator in the thermally assisted magnetic recording head according to an embodiment of the present invention.
Figure 8:
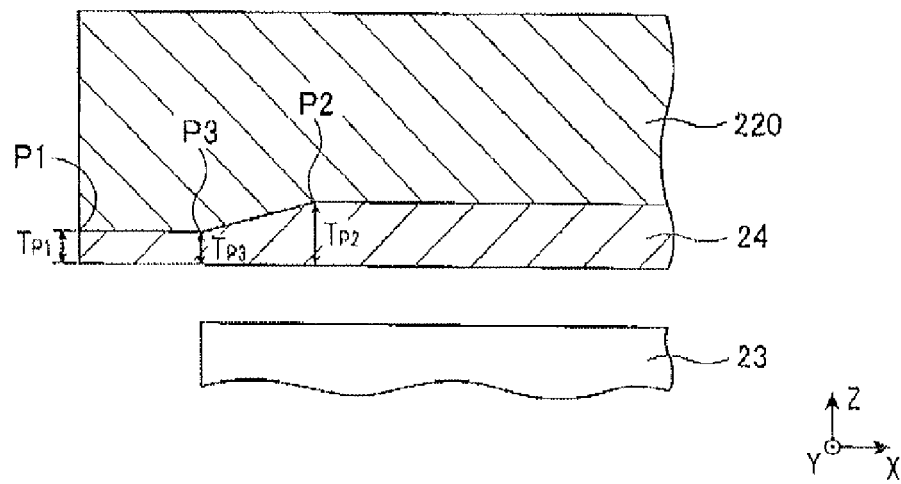
FIG. 8 is a cross-sectional view in the XZ plane schematically showing a configuration of the waveguide, the plasmon generator and the main magnetic pole in the thermally assisted magnetic recording head according to an embodiment of the present invention.

FIG. 6 is a plan view showing a configuration of, or near, the head part end surface 12a formed by the waveguide 23, the plasmon generator 24 and the electromagnetic conversion element 22 in the thermally assisted magnetic recording head 1 according to the present embodiment. FIG. 7 is a plan view showing a configuration of, or near, the head part end surface 12a of the plasmon generator 24 in the thermally assisted magnetic recording head 1 according to the present embodiment. FIG. 8 is a cross-sectional view in the XZ plane schematically showing a configuration of the waveguide 23, the plasmon generator 24 and the main magnetic pole 220 in the thermally assisted magnetic recording head 1 according to the present embodiment.

As shown in FIG. 6, the main magnetic pole 220 of the electromagnetic conversion element 22 and the lower shield 22e extend to the head part end surface 12a. The end surface 221 of the main magnetic pole 220 on the head part end surface 12a includes, for example, a combined shape of a substantially rectangular, square or trapezoidal trailing side part and a substantially triangular reading side part embedded in the groove 242 of the plasmon generator 24. That is, on the surface of the main magnetic pole 220 that opposes the waveguide 23 (waveguide opposing surface), the convex part 222 is provided that has a substantial V-shape that protrudes along the propagation direction (X axis direction) of the laser light (waveguide light) 63 through the waveguide 23. The vertex WFP at the farthest reading side on the end surface 221 is the closest to the lower shield 22e. As a result, this becomes a point where the magnetic field is concentrated most on the end surface 221 and where the writing magnetic field is generated. Because the main magnetic pole 220 includes a minute writing magnetic field generating point (vertex WFP), a minute writing magnetic field that responds to the high recording density can be generated. The angle formed by the vertex WFP of the convex part 222 on the end surface 221 of the main magnetic pole 220 may be 50-120 degrees. With the angle less than 50 degrees, it is possible that the light peak intensity of the near-field light is remarkably decreased. In addition, with the angle larger than 120 degrees, the spot diameter of the near-field light possibly becomes too large.

On the head part end surface 12a, the plasmon generator 24 has a predetermined thickness and is provided in a substantial V-shape to contact the convex part 222 of the main magnetic pole 220. Of the six sides forming the near-field light generating end surface 24a, all sides that do not form the vertex NFP, which is the end of the propagative edge 241, are overlapped with the sides of the end surface 221 of the main magnetic pole 220. As a result, the vertex NFP is the only one of the five vertexes that is distant from the end surface 221 and functions as the emission point for the near-field light.

As shown in FIG. 7, the thickness of the plasmon generator 24 in the direction perpendicular to linear convex part contacting sides 243 and 244 that contact the convex part 222 of the main magnetic pole 220 gradually increases from ends 243a and 244a of the convex part contacting sides 243 and 244 that are the closest to the waveguide 23, to the other ends 243b and 244b. Because the plasmon generator 24 has such a shape, heat generated at the vertex NFP (near-field light emission point) on the near-field light generating end surface 24a can be dissipated diagonally-upwardly along the substantial V-shape of the plasmon generator 24. As a result, an excess increase in temperature can be suppressed at the plasmon generator 24, thereby helping prevent an unnecessary protrusion of the near-field light generating end surface 24a and a significant loss of light utilization efficiency at the plasmon generator 24. Moreover, because the heat is constrained from escaping to the side of the main magnetic pole 220 with the plasmon generator 24 having such a shape, degradation of the main magnetic pole 220 due to heat can be suppressed.

It is preferable that a relationship between the thickness D1 at the ends 243a and 244a and the thickness D2 at the other ends 243b and 244b of the convex part contacting sides 243 and 244 of the plasmon generator 24 satisfies D2/D1>1. In addition, their ratio (D2/D1) is preferably 1.05-3.0, and more preferably 1.1-1.5. If the ratio (D2/D1) exceeds 3.0, the volume of the convex part 222 of the main magnetic pole 220 decreases, and a recording magnetic field sufficient for writing information may not be obtained.

As shown in FIG. 8, the plasmon generator 24 includes a first point P1 that is the closest to the waveguide 23 and that contacts the convex part 222 on the near-field light generating end surface 24a and a second point P2 that is positioned at a position away from the first point P1 by a predetermined length in the X axis direction and that contacts the convex part 222. It is preferable that the thickness $T_{P2}$ in the Z axis direction at the second point P2 is larger than the thickness $T_{P1}$ in the Z axis direction at the first point P1. With the plasmon generator 24 having such a shape, the coupling efficiency of the laser light in the surface plasmon mode can be increased up to the second point P2 with a larger thickness in the Z axis direction. With the smaller thickness at the first point P1, the distance between the vertex WFP on the end surface 221 of the main magnetic pole 220 and the vertex NFP (near-field light emission point) on the near-field light generating end surface 24a can be reduced, and the peak intensity for the generated near-field light can be increased, thereby allowing the recording of information at high receiving density. Furthermore, the heat generated at the vertex NFP on the near-field light generating end surface 24a can be easily dissipated in the X axis direction (+X side) on the plasmon generator 24. Therefore, the dissipation of the heat to the side of the main magnetic pole 220 can be further suppressed. Thus, the plasmon generator 24 is constrained from the excess increase in temperature. Further, unnecessary protrusion of the near-field light generating end surface 24a and a significant loss of light utilization efficiency for the plasmon generator 24 can be avoided.

The thickness $T_{P1}$ in the Z axis at the first point P1 of the plasmon generator 24 is preferably 10-50 nm, and more preferably 15-40 nm. If the thickness $T_{P1}$ is less than 10 nm, the magnetic recording may become difficult even with the plasmon generator 24 in which the thickness in the perpendicular direction of the convex part contacting surfaces 243 and 244 gradually increases from the end 243a and 244a to the other ends 243b and 244b of the convex part contacting sides 243 and 244 (D2/D1>1) and in which the thickness $T_{P2}$ in the Z axis direction at the second point P2 is larger than the thickness $T_{P1}$ in the X axis direction at the first point P1 ($T_{P2} > T_{P1}$). If the thickness $T_{P1}$ exceeds 50 nm, recording at high recording density may become difficult. That is, with the thickness $T_{P1}$ being in the above-described range, a writing magnetic field that has a sufficiently large gradient can be applied at a part of the magnetic recording layer of the magnetic disk 301 that has been sufficiently heated. As a result, a stable writing operation by the thermal assist can be accurately accomplished.

Furthermore, with a third point P3 positioned between the first point P1 and the second position P2, the thickness in the Z axis direction of the plasmon generator 24 may be substantially constant (or the same) from the first point P1 to the third point P3 and may be gradually increased from the third point P3 to the second point P2. The length from the first point P1 to the third point P3 may be 10-300 nm, and preferably 50-200 nm. If the length between the first point P1 and the third point P3 exceeds 300 nm, the light density remarkably decreases, and it becomes impractical.

Figure 9:
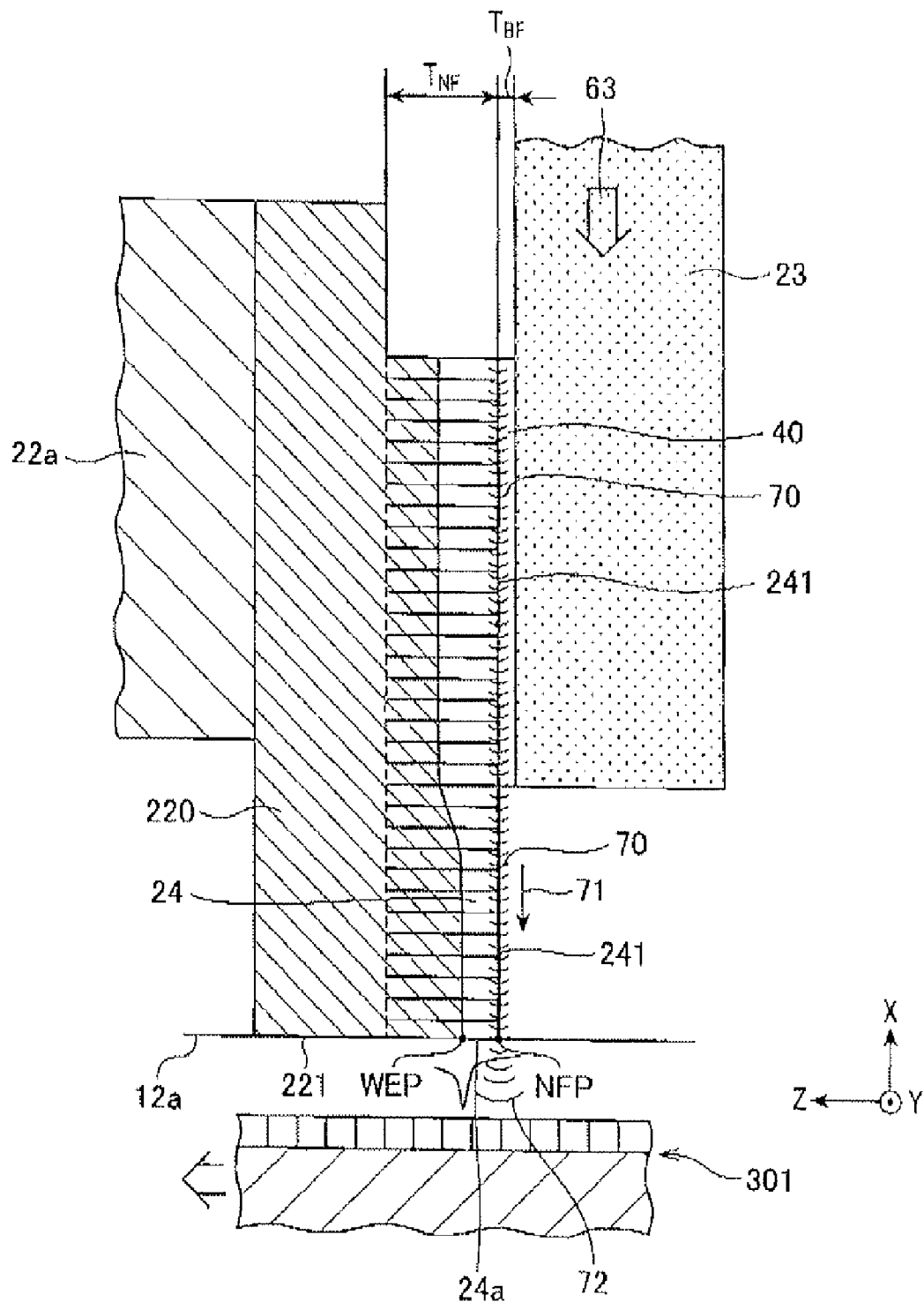
FIG. 9 is a schematic diagram for explaining thermally assisted magnetic recording using a surface plasmon mode with the thermally assisted magnetic recording head according to an embodiment of the present invention.

Next, effects of the thermally assisted magnetic recording head 1 according to the present embodiment having the above-describe configuration are explained. FIG. 9 is a schematic diagram for explaining thermally assisted magnetic recording using the surface plasmon mode in the thermally assisted magnetic recording head 1 according to the present embodiment.

As shown in FIG. 9, for writing information in the magnetic recording layer of the magnetic disk 301 by the electromagnetic conversion element 22, the laser light (waveguide light) 63 emitted from the laser diode 60 of the light source unit 50 is first propagated through the waveguide 23. Then, the laser light (waveguide light) 63 that has advanced to the vicinity of the buffer portion 40 is coupled to the optical structure formed by the waveguide 23 that has a refractive index $n_{WG}$, the buffer portion 40 having a refractive index $n_{BF}$, and the plasmon generator 24 formed by a conductive material, such as metal, to excite a surface plasmon mode on the propagative edge 241 of the plasmon generator 24. That is, the laser light (waveguide light) 63 is coupled to the plasmon generator 24 in the surface plasmon mode. Actually, from the optical interfacial state between the waveguide 23, which is a core, and the buffer portion 40, evanescent light is excited in the buffer portion 40. Next, the surface plasmon is excited by coupling the evanescent light and a fluctuation of charges excited on the metal surface (propagative edge 241) of the plasmon generator 24. More specifically, because the surface plasmon, which is elementary excitation in this system, is coupled to the electromagnetic wave, a surface plasmon polariton is excited. The surface plasmon polariton is simply referred to as surface plasmon hereinafter. The propagative edge 241 is located at a position closest to the waveguide 23 on the lower surfaces 24a and 24b of the plasmon generator 24 and has an angled part where the electric field is concentrated. Therefore, the surface plasmon can be easily excited. At this time, induction of the surface plasmon is achieved by configuring the refractive index $n_{BF}$ for the buffer portion 40 to be smaller than the refractive index $n_{WG}$ of the waveguide 23 ($n_{BF} < n_{WG}$) and by appropriately selecting the length of the buffer portion 40 (in the X axis direction), that is, the length $L_{BF}$ of the coupled portion of the waveguide 23 and the plasmon generator 24, and the thickness $T_{BF}$ of the buffer portion 40 (in the Z axis direction).

In the excited surface plasmon mode, surface plasmon 70 is excited on the propagative edge 241 of the plasmon generator 24 and is propagated on the propagative edge 241 along the direction of arrow 71. This propagative edge 241 is the only side among the sides of the plasmon generator 24 that is not covered or does not contact the main magnetic pole 220, thereby preventing negative influence of the main magnetic pole 220, which is not adjusted for efficient excitation of surface plasmon. As a result, the surface plasmon can be deliberately propagated on the propagative edge 241.

As the surface plasmon 70 is propagated on the propagative edge 241 in the direction of arrow 71, the surface plasmon 70, that is, the electric field, is concentrated at the vertex NFP of the near-field light generating end surface 24a, which is on the same plane as the head part end surface 12a and which is the destination of the propagative edge 241. As a result, near-field light 72 is generated from the vertex NFP. The near-field light 72 is emitted towards the magnetic recording layer of the magnetic disk 301. The near-field light 72 reaches the surface of the magnetic disk 301 and heats up the magnetic recording layer part of the magnetic disk 301. As a result, an anisotropic magnetic field (coercive force) of that part decreases to a value at which the writing of data can be performed. Immediately after that, a writing magnetic field generated from the main magnetic pole 220 is applied to that part to perform the writing. This accomplishes the thermally assisted magnetic recording.

At this time, heat is generated near the vertex NFP of the near-field light generating end surface 24a due to the generation of the near-field light 72. However, because the thickness of the plasmon generator 24 gradually increases from the ends 243a and 244a to the other ends 243b and 244b of the convex part contacting sides 243 and 244 of the plasmon generator 24, the heat generated near the vertex NFP of the near-field generating end surface 24a dissipates in the direction of the other ends 243b and 244b of the plasmon generator 24. Further, because the thickness $T_{P2}$ at the second point P2 is greater than the thickness $T_{P1}$ at the first point P1, the heat also dissipates in the X axis direction (+X side) of the plasmon generator 24. As a result, excess increase in temperature of the plasmon generator 24 is suppressed, helping prevent an unnecessary protrusion of the near-field light generating end surface 24a and a significant decrease in light utilization efficiency at the plasmon generator 24. Furthermore, because the dissipation of heat to the side of the main magnetic pole 220 is suppressed, degradation and the like of the main magnetic pole 220 due to the heat that dissipates to the side of the main magnetic pole 220 can be constrained.

The above-described thermally assisted magnetic recording head may be manufactured as described below.

FIGS. 10A-10F are schematic diagrams showing a process for forming the plasmon generator 24 and the main magnetic pole 220 in the thermally assisted magnetic recording head according to the present embodiment. All drawings (FIGS. 10A-10F) are plan views of the YZ plane seen from the side of the medium opposing surface.

Figure 10A:
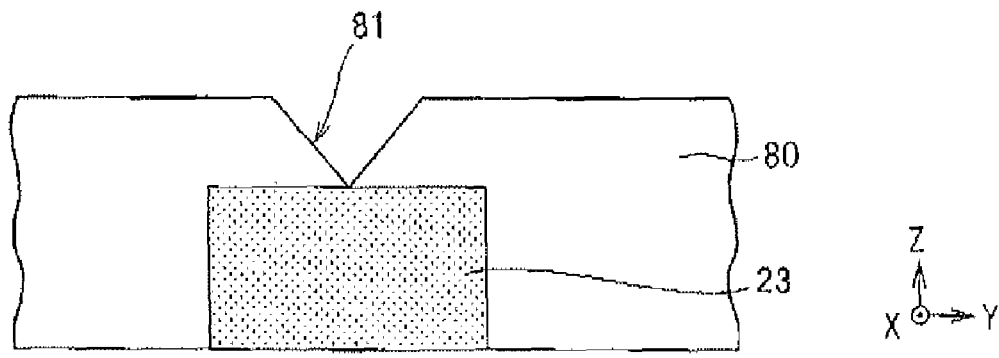
FIGS. 10A-10F are schematic diagrams showing a process for forming the plasmon generator and the main magnetic pole in the thermally assisted magnetic recording head according to an embodiment of the present invention.

As shown in FIG. 10A, a groove 81 with a substantially V-shaped cross-section is formed by reactive ion etching (RIE) or the like with $CF_4$ as a reactance gas, for example, using a predetermined mask on a first passivation layer 80 that is formed from $Al_2O_3$ (alumina), for example, which surrounds the already-established waveguide 23 formed by $TaO_X$, for example.

Figure 10B:
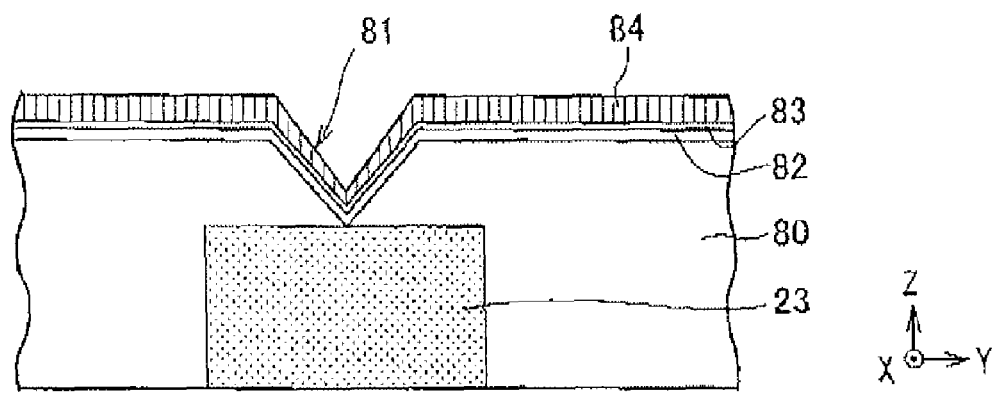

Next, as shown in FIG. 10B, an insulation film 82 formed by $Al_2O_3$ (alumina) is formed by spattering to cover the groove 81. A part of the insulation film 82 later becomes a gap between the waveguide 23 and the plasmon generator 24, that is, the buffer portion 40.

Then, as shown in FIG. 10B, an adhesion layer 83 formed by Ta with a thickness of approximately 1 nm, for example, is formed to cover the formed insulation film 82. Thereafter, on the adhesion layer 83 and at least in the groove 242, a metal layer 84 made of Au or Au alloy is formed by spattering, for example. A part of the metal layer 84 subsequently becomes the plasmon generator 24. The metal layer 84 is formed so that the thickness of the plasmon generator 24 gradually increases from the ends 243a and 244a to the other end 243b and 244b of the convex part contacting sides 243 and 244 as seen from the head part end surface 12a. In addition, the metal layer 84 is formed so that the thickness $T_{P2}$ at the second point P2 is greater than the thickness $T_{P1}$ at the first point P1, and that the thickness gradually increases from the third point P3 to the second point P2. More specifically, to form the metal layer 84 by spattering, a shield part formed from a resist film, for example, is provided between the adhesion layer 83 and a target material, such as AU, to adjust a spattering rate in the area where the metal layer 84 is to be formed. As a result, the thickness of the metal layer 84 can be gradually increased as discussed above.

Figure 10C:
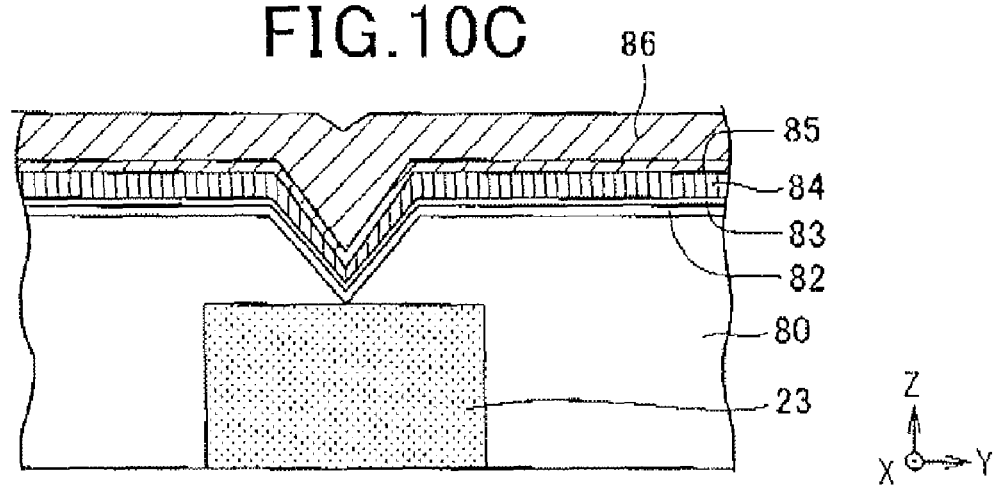

Thereafter, as shown in FIG. 10C, after forming a first electrode film 85 that is formed from a magnetic material, such as FeCo, which forms the main magnetic pole 220, and that has a thickness of 50 nm, to cover the metal layer 84, a first magnetic layer 86 that is formed from the magnetic material, such as FeCo, which forms the same main magnetic pole, is formed with a thickness of 0.5 nm using a plating method, for example.

Figure 10D:
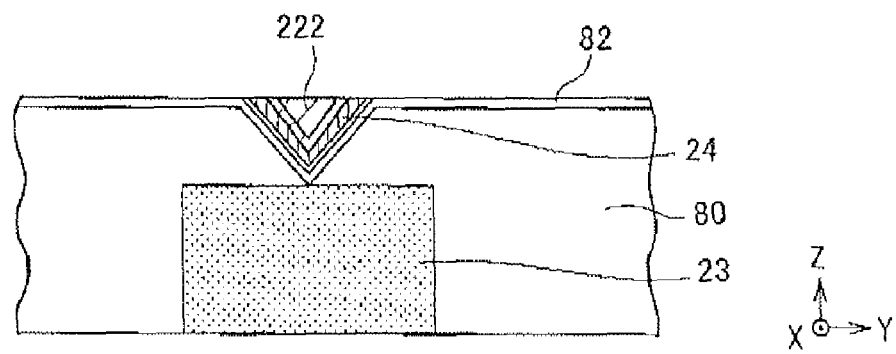

Next, as shown in FIG. 10D, using a dry etching method, such as ion milling, the entire surface is etched until the insulation film 82 is exposed in the locations other than the groove 242. As a result, the plasmon generator 24 is formed. In addition, the remaining parts of the first electrode film 85 and the first magnetic layer 86 form the part of the main magnetic pole 222 that is embedded in the groove 242 formed in the plasmon generator, that is, the convex part 222.

Figure 10E:
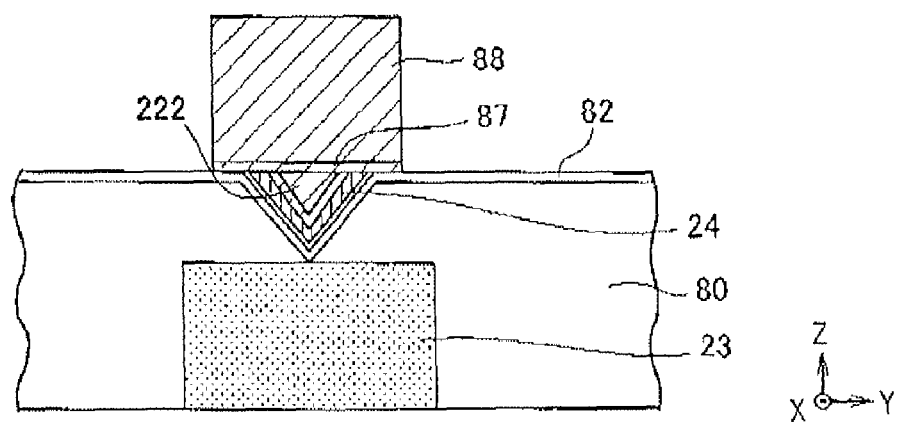
Figure 10F:
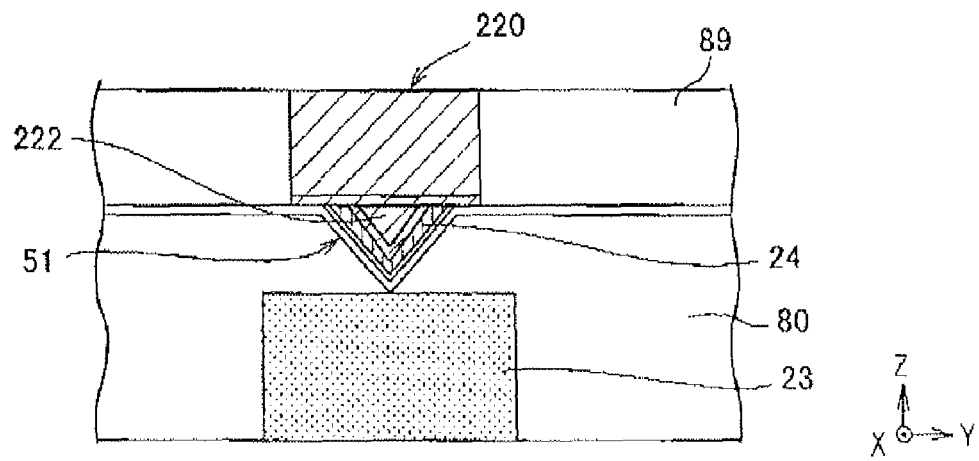

Then, as shown in FIG. 10E, after forming a second electrode film 87 made of the magnetic material, such as FeCo, that forms the main magnetic pole 220 again, a second electrode film 87 is formed by the plating method, for example. Next, to cover the second magnetic layer 88, a second passivation film 89 formed from $Al_2O_3$ (alumina) for example, is formed by spattering and then leveled using a polishing method, such as chemical mechanical polishing (CMP) to complete the main magnetic pole 220.

According to the above-described manufacturing method, the thermally assisted magnetic recording head 1 can be obtained, that includes the main magnetic pole 220, of which the convex part 222 is embedded in the groove 242 provided at the plasmon generator 24, and that accurately establishes the near-field light emission point at a position sufficiently close to a writing magnetic field generation position. In addition, the thickness of the plasmon generator 24 gradually increases from the ends 243a and 244a to the other ends 243b and 244b. The thickness $T_{P2}$ at the second point P2 is greater than the thickness $T_{P1}$ at the first point P1, and the thickness gradually increases from the third point P3 to the second point P2.

The embodiment explained above is described for allowing easy understanding of the present invention and is not described to limit the present invention. Therefore, each element disclosed in the above-described embodiment includes any design modifications and equivalents that fall in the technical scope of the present invention.

Figure 11:
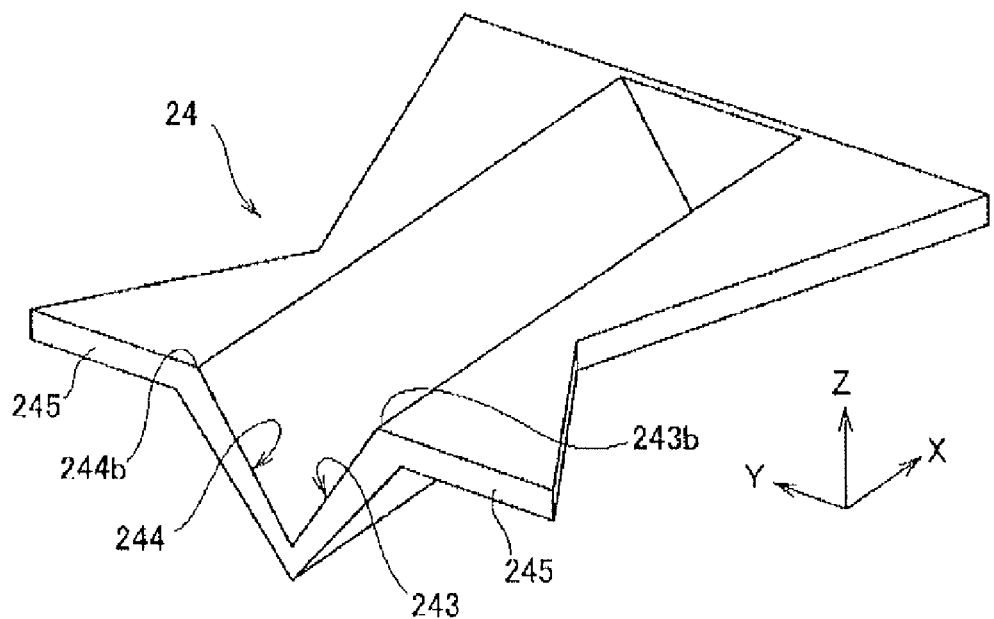
FIG. 11 is a perspective view schematically showing the thermally assisted magnetic recording head according to an embodiment of the present invention.

The above-described thermally assisted magnetic recording head 1 has a configuration in which the plasmon generator 24 has a substantially V-shaped cross-section that extends in the X axis direction. However, the configuration is not limited to this. For example, as shown in FIG. 11, the plasmon generator 24 may include wing-shaped widened parts 245, which are attached to the ends 243b and 244b of the convex part contacting sides 243 and 244 and which are bent outwardly to the outside of the substantially V-shaped part to expand in the Y axis direction as seen from the side of the medium opposing surface.

Figure 12:
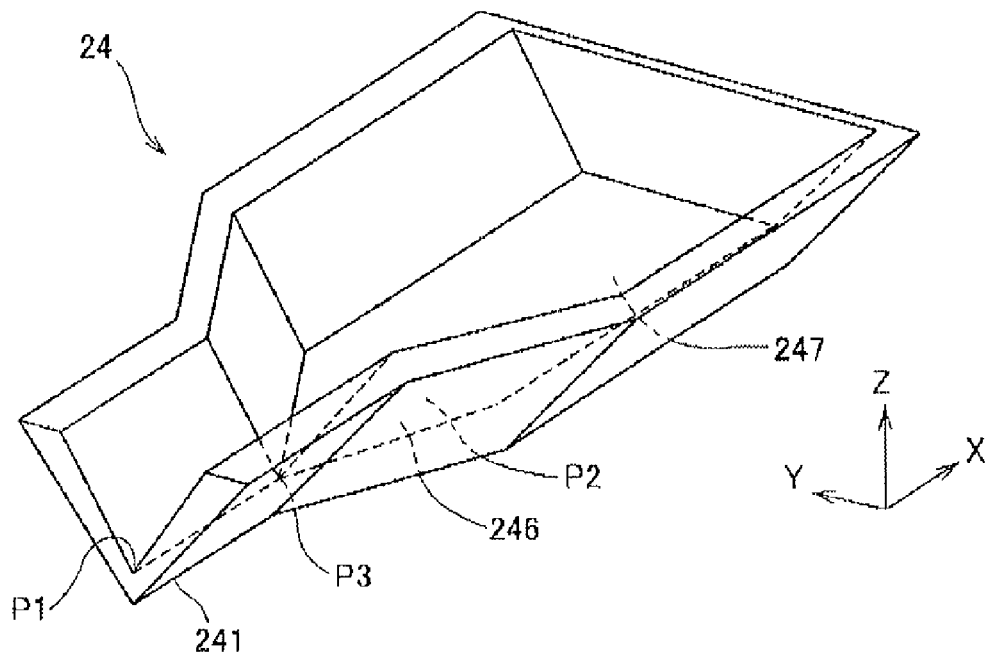
FIG. 12 is a perspective view schematically showing the thermally assisted magnetic recording head according to another embodiment of the present invention.

Moreover, the above-described thermally assisted magnetic recording head 1 has a configuration in which the plasmon generator 24 has a substantially V-shaped cross-section through its entirety in the X axis direction. However, the configuration is not limited to this. For example, as shown in FIG. 12, the plasmon generator 24 may include a propagative edge 241 that is configured to have a V-shaped cross section from the first point P1 to the third point P3, a tapered part 246 that is configured in a tapered shaped which width is widened in the Y axis direction from the third point P3 to the second point P2, and a widened part 247 that has a substantially constant width in the X axis direction from the second point P2. In this case, the width of the widened part 247 in the Y axis direction may be 10-500 nm, and preferably 200-400 nm. With the plasmon generator 24 with such a shape, light utilization efficiency of the widened part 247 increases. In addition, the surface plasmon excited at the widened part 247 is propagated to the head part end surface 12a through the tapered part 246 at which the width in the Y axis direction is reduced. Because the wave number for the surface plasmon increases as the width of the paper part 246 in the width direction decreases, the speed of advancement of the surface plasmon is reduced. As a result, the energy density of the surface plasmon increases, and the electric field intensity of the surface plasmon is enhanced. As a result, the surface plasmon, for which the electric field has been enhanced, is propagated on the propagative edge 241. Therefore, the peak intensity of the near-field light generated at the vertex NFP of the plasmon generator 24 can be increased.

EXAMPLES

The present invention is explained in detail below using experimental examples. However, the present invention is not limited to the below-described experimental examples.

Experimental Example 1

Regarding fluctuations of temperatures at a magnetic pole due to generation of the near-field light in the near-field light generating optical system in the thermally assisted magnetic recording head, a simulation analysis experiment was conducted as discussed below.

This simulation analysis experiment was conducted using a three-dimensional finite-difference time-domain method (FDTD method) that is a method for electromagnetic field analysis.

As a thermally assisted magnetic recording head according to the present experimental example, the thermally assisted magnetic recording head 1 shown in FIGS. 7 and 8 was used, in which the waveguide 23 is formed by $Ta_2O_5$ (refractive index $n_{WG}=2.15$) that has a cross-section with a 500 nm width in the Y axis direction and a 400 nm thickness in the Z axis direction, the passivation layer 31 that functions as a cladding is formed by $Al_2O_3$ (alumina, refractive index $n_{BF}=1.65$), and the convex part 222 of the main magnetic pole 220 is formed by FeNi alloy. In addition, the angle formed by the vertex WFP on the convex part 222 of the main magnetic pole 220 was configured to 90 degrees in this model. Further, the plasmon generator 24 was formed by Au along the convex part 222. The thickness $T_{P1}$ in the Z axis direction at the first point P1 was set to 30 nm. The distance between the first point P1 to the third point P3 was set to 50 nm. The distance between the third point P3 and the second point P2 was set to 100 nm. The thickness $T_{P2}$ in the direction towards the waveguide 23 at the second point P2 was set to 100 nm. Furthermore, the distance between an end (the vertex NFP on the side of the head part end surface 12a) of the propagative edge 241 of the plasmon generator 24 and the waveguide 23 was set to 35 nm.

A magnetic pole temperature at a position away from the vertex NFP by 50 nm in the Z axis direction (+Z direction) was calculated by the simulation analysis in the case where the ratio of the thickness D1 in the direction perpendicular to the convex part contacting sides 243 and 244 at the ends 243a and 244a of the convex part contacting sides 243 and 244 of the plasmon generator 24 and the thickness D2 in the direction perpendicular to the convex part contacting sides 243 and 244 at the other ends 243b and 244b (D2/D1) is changed in a range of 0.6-1.4. Then, a relationship between the thickness ratio (D2/D1) and the magnetic pole temperature was determined.

In this simulation analysis experiment, the laser light 63 irradiated through the waveguide 23 was a Gaussian beam (15 mW) having a wavelength of 800 nm and transverse magnetic (TM) polarization (oscillation direction of electric field of the laser light is perpendicular to the layer surface of the waveguide 23; Z axis direction). The temperature was calculated at a point on the convex part 222 after 1000 ps from the commencement of generation of the near-field light.

Figure 13:
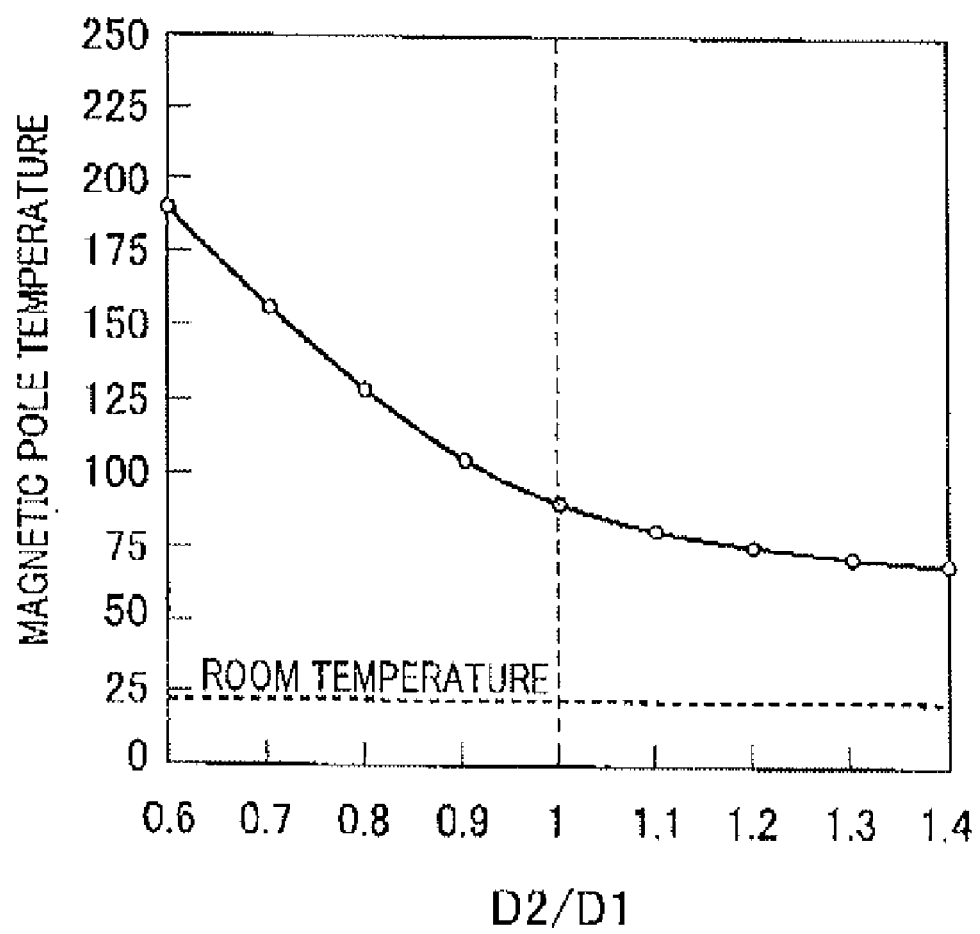
FIG. 13 is a graph showing results of a simulation analysis experiment according to Experimental Example 1.

The results of the above-described simulation analysis experiment are shown in FIG. 13. FIG. 13 is a graph showing results of the simulation analysis experiment. As shown in FIG. 13, in the case of D2/D1>1, with D2/D1=1 as a reference, it was determined that the magnetic pole temperature decreased by 10% or more. On the other hand, in the case of D2/D1<1, with D2/D1=1 as a reference, it was determined that the magnetic pole temperature increased by 15% or more.

Based on these results of the simulation analysis, it is understood that the heat can be suppressed from dissipating from the plasmon generator 24 to the magnetic pole (main magnetic pole 220) by configuring the ratio at D2/D1>1, that is, by gradually increasing the thickness of the plasmon generator 24 in the direction perpendicular to the convex part contacting sides 243 and 244 of the plasmon generator 24 from the ends 243a and 244a to the other ends 243b and 244b of the convex part contacting sides 243 and 244 (in the direction away from the waveguide 23).

Experimental Example 2

The following simulation analysis experiment was conducted regarding the relationship between the thickness of the plasmon generator and the peak intensity of the near-field light for the generation of the near-field light in the near-field light generating optical system in the thermally assisted magnetic recording head.

The simulation analysis experiment was conducted using a three-dimensional finite-difference time-domain method (FDTD method) that is a method for electromagnetic field analysis.

In the present experimental example, the thermally assisted magnetic recording head 1 shown in FIGS. 7 and 8 was used, in which the waveguide 23 was formed by $Ta_2O_5$ (refractive index $n_{WG}$=2.15) that had a cross-section with a 500 nm width in the Y axis direction and a 400 nm thickness in the Z axis direction, the passivation layer 31 that functions as a cladding was formed by $Al_2O_3$ (alumina, refractive index $n_{BF}$=1.65), and the convex part 222 of the main magnetic pole 220 was formed by FeNi alloy. In addition, the angle formed by the vertex WFP on the convex part 222 of the main magnetic pole 220 was configured to 90 degrees in this model. Further, the plasmon generator 24 was formed by Au along the convex part 222. The distance between the third point P3 and the second point P2 was set to 100 nm. The thickness $T_{P2}$ in the direction towards the waveguide 23 at the second point P2 was set to 100 nm. The ratio of the thickness D1 in the direction perpendicular to the convex part contacting sides 243 and 244 at the ends 243a and 244a of the convex part contacting sides 243 and 244 of the plasmon generator 24 and the thickness D2 in the direction perpendicular to the convex part contacting sides 243 and 244 at the other ends 243b and 244b (D2/D1) was set to 1.3.

The near-field light peak intensity ($V^2/m^2$) at the time when the thickness $T_{P1}$ in the perpendicular direction (Z axis direction) at the first point P1 of the plasmon generator located at the position closest to the waveguide 23 was changed in a range of 10-100 nm was calculated by the simulation analysis, and the relationship between the thickness $T_{P1}$ and the near-field light peak intensity ($V^2/m^2$) was determined. In this simulation analysis experiment, the laser light 63 irradiated through the waveguide 23 was a Gaussian beam (15 mW) having a wavelength of 800 nm and transverse magnetic (TM) polarization (oscillation direction of electric field of the laser light is perpendicular to the layer surface of the waveguide 23; Z axis direction). The results of the simulation analysis experiment are shown in FIG. 14.

Figure 14:
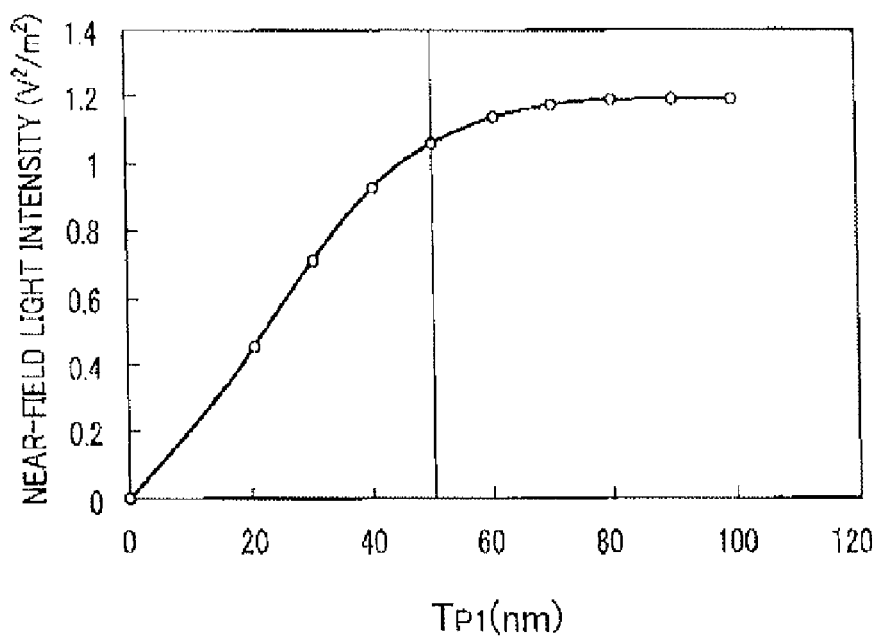
FIG. 14 is a graph showing results of a simulation analysis experiment according to Experimental Example 2.

FIG. 14 is a graph showing the results of the simulation analysis experiment. As shown in FIG. 14, the near-field light peak intensity increased as the thickness $T_{P1}$ became thicker. Therefore, it allowed heating the magnetic disk 301 to a high temperature. However, because recording with high density becomes difficult when the thickness $T_{P1}$ exceeds 50 nm, it is necessary to control the thickness at 50 nm or less to achieve the recording density equal to or greater than 1 Tbpsi. In contrast, if the near-field light peak intensity is less than 0.2 ($V^2/m^2$), it becomes difficult to increase the temperature of magnetic disk, and thus, the magnetic recording becomes difficult.

Experimental Example 3

The following simulation analysis experiment was conducted regarding the relationship between the thickness of the plasmon generator and the peak intensity of the near-field light for the generation of the near-field light in the near-field light generating optical system in the thermally assisted magnetic recording head.

The simulation analysis experiment was conducted using a three-dimensional finite-difference time-domain method (FDTD method) that is a method for electromagnetic field analysis.

In the present experimental example, the thermally assisted magnetic recording head 1 shown in FIGS. 7 and 8 was used, in which the waveguide 23 was formed by $Ta_2O_5$ (refractive index $n_{WG}$=2.15) that had a cross-section with a 500 nm width in the Y axis direction and a 400 nm thickness in the Z axis direction, the passivation layer 31 that functions as a cladding was formed by $Al_2O_3$ (alumina, refractive index $n_{BF}$=1.65), and the convex part 222 of the main magnetic pole 220 was formed by FeNi alloy. In addition, the angle formed by the vertex WFP on the convex part 222 of the main magnetic pole 220 was configured to 90 degrees in this model. Further, the plasmon generator 24 was formed by Au along the convex part 222. The ratio of the thickness D1 in the direction perpendicular to the convex part contacting sides 243 and 244 at the ends 243a and 244a of the convex part contacting sides 243 and 244 of the plasmon generator 24 and the thickness D2 in the direction perpendicular to the convex part contacting sides 243 and 244 at the other ends 243b and 244b (D2/D1) was set to 1.3.

The near-field light peak intensity ($V^2/m^2$) at the time when the distance from the first point P1 to the third point P3 is changed in the range of 10-400 nm while the thickness $T_{P1}$ in the perpendicular direction (Z axis direction) at the first point P1 of the plasmon generator 24 located at the position closest to the waveguide 23 was 10 nm and 35 nm, was calculated by the simulation analysis. The relationship between the distance from the first point P1 to the third point P3 and the near-field light peak intensity ($V^2/m^2$) was then determined. In this simulation analysis experiment, the laser light 63 irradiated through the waveguide 23 was a Gaussian beam (15 mW) having a wavelength of 800 nm and transverse magnetic (TM) polarization (oscillation direction of electric field of the laser light is perpendicular to the layer surface of the waveguide 23; Z axis direction). The results of the simulation analysis experiment are shown in FIG. 15.

Figure 15:
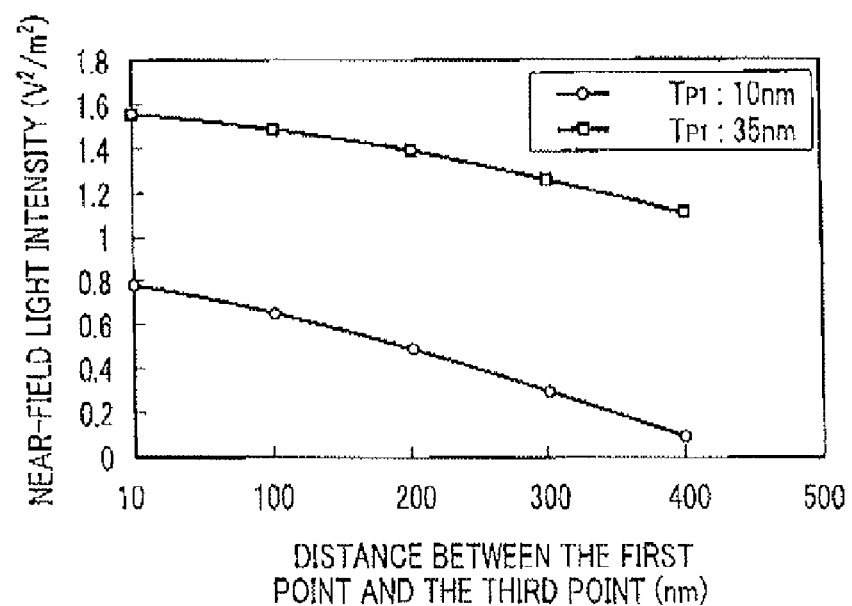
FIG. 15 is a graph showing results of a simulation analysis experiment according to Experimental Example 3.

FIG. 15 is a graph showing the results of the simulation analysis experiment. As shown in FIG. 15, when the thickness $T_{P1}$ in the perpendicular direction (Z axis direction) at the first point P1 of the plasmon generator 24 is 10 nm, if the distance from the first point P1 to the third point P3 exceeds 300 nm, the light density remarkably decreased and became impractical.

From the results of above-described Experimental Examples 1 and 2, it is understood that recording with high density is possible by configuring the thickness $T_{P1}$ of the plasmon generator 24 at 10-50 nm and the ratio of D1 and D2 at D2/D1>1, and that the heat at the plasmon generator can be suppressed from dissipating to the magnetic pole. In addition, in view of the results of Experimental Example 3, both high light density necessary for heating and good heat dissipation can be achieved by configuring the thickness $T_{P1}$ of the plasmon generator 24 at 10-50 nm and the ratio of D1 and D2 at D2/D1>1, as well as configuring the distance from the first point P1 to the third point P3 at 10-300 nm.

What is claimed is:

1. A thermally assisted magnetic head, comprising:
a magnetic pole that generates a writing magnetic field from an end surface, which forms a part of a medium opposing surface that opposes a magnetic recording medium;
a waveguide through which light for exciting surface plasmon propagates; and
a plasmon generator that is provided between the magnetic pole and the waveguide and that generates near-field light from a near-field light generating end surface that forms a part of the medium opposing surface by coupling the light thereto in a surface plasmon mode, wherein
the magnetic pole includes a convex part that protrudes in a substantially V-shape along a light propagation direction of the waveguide on a waveguide opposing surface that opposes the waveguide,
the plasmon generator includes a substantially V-shaped part that contacts the convex part,
as seen from a side of the medium opposing surface, a thickness of the plasmon generator in a direction perpendicular to convex part contacting sides gradually increases from an end positioned closest to the waveguide on the convex part contacting sides in a direction away from the waveguide, the convex part contacting sides being linear sides that form the substantially V-shaped part of the plasmon generator and contacting the convex part, and
a thickness of the plasmon generator in a direction from a second point toward a side of the waveguide is greater than a thickness of the plasmon generator in a direction from a first point toward the side of the waveguide, the first point being defined as a position, on the near-field light generating end surface, that is closest to the waveguide and that contacts the convex part, the second point being defined as a position away from the first point in a direction opposite from the light propagation direction.

2. The thermally assisted magnetic recording head according to claim 1, wherein
a ratio of a thickness D1 of the plasmon generator at the end in the direction perpendicular to the convex part contacting sides and a thickness D2 of the plasmon generator at another end of the convex part contacting sides in the direction perpendicular to the convex part contacting sides (D2/D1) is 1.05-3.0.

3. The thermally assisted magnetic recording head according to claim 1, wherein
the thickness of the plasmon generator in a direction from the first point towards the side of the waveguide is 10-50 nm.

4. The thermally assisted magnetic recording head according to claim 1, wherein
a thickness of the plasmon generator in a direction towards the side of the waveguide from the first point to a third point, which is positioned between the first point and the second point, is substantially constant, and
the thickness of the plasmon generator towards a side of the waveguide gradually increases from the third point to the second point.

5. The thermally assisted magnetic recording head according to claim 4, wherein
a length from the first point to the third point is 10-300 nm.

6. The thermally assisted magnetic recording head according to claim 1, wherein
the plasmon generator includes wing-shaped widened parts, as seen from a side of the medium opposing surface, that are connected to another end side of the convex part contacting sides and that are bent outwardly and widen from the another end side of the convex part contacting sides having the substantial V-shape as a base.

7. The thermally assisted magnetic recording head according to claim 4, wherein
surfaces of the plasmon generator that oppose the waveguide are flat surfaces that oppose the waveguide with a predetermined gap, and
the plasmon generator includes:
a propagative edge provided continuously from the first point to the third point,
a tapered part provided continuously such that a width thereof is gradually widened from the third point to the second point, and
a widened part provided to have a predetermined width from the second point in a direction opposite from the light propagation direction through the waveguide.

8. A head gimbal assembly, comprising:
the thermally assisted magnetic recording head according to claim 1; and
a suspension that supports the thermally assisted magnetic recording head.

9. A magnetic recording device, comprising:
a magnetic recording medium;
the thermally assisted magnetic recording head according to claim 1; and
a positioning device that supports and positions the thermally assisted magnetic recording head with respect to the magnetic recording medium.

10. A thermally assisted magnetic head, comprising:
a magnetic pole that generates a writing magnetic field from an end surface and that includes a projection, at least a part of the projection having a substantially V-shape;
a waveguide through which light for exciting surface plasmon propagates and which extends in a first direction perpendicular to a medium opposing surface; and
a plasmon generator that generates near-field light, the plasmon generator being provided between the magnetic pole and the waveguide, at least a part of the plasmon generator including a substantially V-shaped groove that contacts the V-shaped projection of the magnetic pole, the plasmon generator having a thickness that is less at a first end of a sloped side of the V-shaped groove than a second end, the first end being closer to the waveguide than the second end, wherein
the waveguide and the plasmon generator extend in the first direction perpendicular to the medium opposing surface,
the plasmon generator has a thickness in a second direction perpendicular to the first direction and includes a first point, a second point and a third point along the first direction, the first point being closest to the medium opposing surface, the third point being between the first and second points, and
the thickness in the second direction of the plasmon generator being constant between the first to third points and gradually increases from the third point to the second point.

11. The thermally assisted magnetic recording head according to claim 10, wherein
the thickness gradually increases from the first end to the second end of the plasmon generator and has a ratio D2/D1 in a range of 1.05-3.0, where D1 is the thickness of the plasmon generator at the first end and D2 is the thickness of the plasmon generator at the second end.

12. The thermally assisted magnetic recording head according to claim 10, wherein the plasmon generator is an escape path for heat generated by the near-field light.

13. A thermally assisted magnetic head, comprising:
a magnetic pole that generates a writing magnetic field from an end surface and that includes a projection;
a waveguide through which light for exciting surface plasmon propagates and which extends in a first direction perpendicular to a medium opposing surface;
a plasmon generator that generates near-field light, the plasmon generator being provided between the magnetic pole and the waveguide and including a groove that contacts the V-shaped projection of the magnetic pole, the plasmon generator having a thickness in a second direction perpendicular to the first direction and including a first point, a second point and a third point along the first direction, the first point being closest to the medium opposing surface, the third point being between the first and second points, wherein
the thickness in the second direction of the plasmon generator being constant between the first to third points and gradually increases from the third point to the second point.

* * * * *